(12) United States Patent
Mishra

(10) Patent No.: US 11,794,222 B1
(45) Date of Patent: Oct. 24, 2023

(54) PASSIVE BRUSHES FOR CLEANING SURFACES IN THE PRESENCE OF ACOUSTIC EXCITATION

(71) Applicant: Amazon Technologies, Inc., Seattle, WA (US)

(72) Inventor: Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 586 days.

(21) Appl. No.: 16/698,091

(22) Filed: Nov. 27, 2019

(51) Int. Cl.
*B08B 1/00* (2006.01)
*B08B 7/04* (2006.01)
*G01P 5/165* (2006.01)
*B64F 5/30* (2017.01)

(52) U.S. Cl.
CPC .............. *B08B 7/04* (2013.01); *B08B 1/002* (2013.01); *B64F 5/30* (2017.01); *G01P 5/165* (2013.01); *B08B 2209/027* (2013.01)

(58) Field of Classification Search
USPC ........................................... 15/53.1, 94
See application file for complete search history.

(56) References Cited

U.S. PATENT DOCUMENTS

| | | | |
|---|---|---|---|
| 4,895,448 | A | 1/1990 | Laird |
| 6,622,135 | B1 | 9/2003 | Imbert De Tremiolles et al. |

(Continued)

OTHER PUBLICATIONS

D. Vernon. Machine Vision: Automated Visual Inspection and Robot Vision. Automatica, vol. 30, No. 4, pp. 731-732 (1994), Elsevier Science, Ltd., Great Britain.

Wu, H.-Y., Rubinstein, M., Shih, E., Guttag, J., Durand, F., Freeman, W. "Eulerian Video Magnification for Revealing Subtle Changes in the World," ACM Transactions on Graphics, vol. 31, No. 4, New York, N.Y., Jul. 2012, 8 pages.

A. Krizhevsky, I. Sutskever, and G. E. Hinton. Imagenet classification with deep convolutional neural networks. NIPS 12 Proceedings of the 25th Int'l Conference on Neural Information Processing Systems (vol. 1), Lake Tahoe, Nevada, pages 1097-1105, 2012.

(Continued)

*Primary Examiner* — Mikhail Kornakov
*Assistant Examiner* — Ryan L Coleman
(74) *Attorney, Agent, or Firm* — Athorus, PLLC

(57) ABSTRACT

Passive brushes formed from plastics, rubbers or other suitable materials may be inserted into openings of aerial vehicles or other machines and subjected to excitation at natural frequencies of vibration of the passive brushes. Where surfaces of the passive brushes are in contact with surfaces of components that are fouled by dust, dirt, grime, or other substances, the vibration of the passive brushes resulting from the excitation causes the dust, dirt, grime or other substances to be released from such surfaces. The passive brushes may have dimensions or shapes that are selected to correspond to internal dimensions of the aerial vehicles or specific components, and may be formed by 3D printing, nanolithography, or in any other suitable manner.

20 Claims, 26 Drawing Sheets

(56) References Cited

U.S. PATENT DOCUMENTS

| | | | |
|---|---|---|---|
| 10,053,236 | B1 | 8/2018 | Buchmueller et al. |
| 2007/0209133 | A1* | 9/2007 | Linzell ................ A45D 34/04 |
| | | | 15/209.1 |
| 2007/0280501 | A1 | 12/2007 | Walton |
| 2010/0235037 | A1 | 9/2010 | Vian et al. |
| 2012/0250010 | A1 | 10/2012 | Hannay |
| 2012/0305022 | A1* | 12/2012 | Bickford ............. A45D 40/265 |
| | | | 132/218 |
| 2014/0067164 | A1 | 3/2014 | Papadopoulos et al. |
| 2015/0336671 | A1 | 11/2015 | Winn et al. |
| 2015/0355101 | A1 | 12/2015 | Sun |
| 2016/0003954 | A1 | 1/2016 | Broussard III et al. |
| 2016/0093124 | A1 | 3/2016 | Shi et al. |
| 2016/0264262 | A1 | 9/2016 | Colin et al. |
| 2016/0376031 | A1 | 12/2016 | Michalski et al. |
| 2016/0379154 | A1 | 12/2016 | Rodoni |
| 2017/0328838 | A1 | 11/2017 | Umehara |
| 2018/0068433 | A1 | 3/2018 | Imakoga |
| 2018/0322366 | A1 | 11/2018 | Lim et al. |
| 2020/0254494 | A1* | 8/2020 | Bolton et al. .......... B23K 26/40 |

OTHER PUBLICATIONS

A. Radford, L. Metz, and S. Chintala. Unsupervised Representation Learning with Deep Convolutional Generative Adversarial Networks. Submitted as Conference Paper for ICLR 2016, San Juan, Puerto Rico, May 2-4, 2016.

A. Shrivastava, T. Pfister, O. Tuzel, J. Susskind, W. Wang, and R. Webb. Learning from Simulated and Unsupervised Images through Adversarial Training. Submitted Nov. 15, 2016, for oral presentation at Conference on Computer Vision and Pattern Recognition (CVPR 2017), Honolulu, Hawaii; presented at CVPR 2017 on Jul. 23, 2017.

B. Zhou, A. Khosla, A. Lapedriza, A. Oliva, and A. Torralba. Learning Deep Features for Discriminative Localization. In Proceedings of the IEEE Conference on Computer Vision and Pattern Recognition (CVPR 2016), Las Vegas, Nevada, pages 2921-2929, IEEE 2016.

D. Kingma and J. Ba. Adam: A Method for Stochastic Optimization, The Hebrew University of Jerusalem, Advanced Seminar in Deep Learning, Oct. 18, 2015.

D. Kingma and J. Ba. Adam: A method for stochastic optimization. Published at the 3rd International Conference for Learning Representations (ICLR 2015), San Diego, May 9, 2015.

D. Martin. A Practical Guide to Machine Vision Lighting, Advanced Illumination, Rochester, Vt., Feb. 2012.

D. Mery and M.A. Berti. Automatic Detection of Welding Defects Using Texture Features. Insight-Non- Destructive Testing and Condition Monitoring, 45(10):676-681, 2003. Presented at Int'l Symposium on Computed Tomography and Image Processing for Industrial Radiology, Berlin, Germany, Jun. 23-25, 2003.

D. Sammons, W.P. Winfree, E. Burke, and S. Ji. Segmenting delaminations in carbon fiber reinforced polymer composite CT using convolutional neural networks. AIP Conference Proceedings, volume 1706, page 110014. American Institute of Physics, AIP Publishing, 2016.

D. Soukup and R. Huber-Mörk. Convolutional Neural Networks for Steel Surface Defect Detection from Photometric Stereo Images, pages 668-677. Advances in Visual Computing, 10th Int'l Symposium (ISVC 2014), Las Vegas, Nevada, Dec. 8-10, 2014. Springer International Publishing, Switzerland, 2014 (LNCS 8887).

D. Wang, A. Khosla, R. Gargeya, H. Irshad, and A. H. Beck. Deep Learning for Identifying Metastatic Breast Cancer. Computer Research Repository (CoRR), Jun. 18, 2016.

Freeman, William T., and Adelson, Edward H. "The Design and Use of Steerable Filters," IEEE Transactions on Pattern Analysis and Machine Intelligence, vol. 13, No. 9, Sep. 1991, 16 pages.

G. Wang and T. Liao. Automatic identification of different types of welding defects in radiographic images. NDT&E International, 35(8):519-528 (2002), Elsevier Science Ltd., Great Britain.

H. Raafat and S. Taboun. An Integrated Robotic and Machine Vision System for Surface Flaw Detection and Classification Computers & Industrial Engineering, Elsevier Science Ltd., Great Britain, 30(1):27-40, 1996.

I. Goodfellow, J. Pouget-Abadie, M. Mirza, B. Xu, D. Warde-Farley, S. Ozair, A. Courville, and Y. Ben-gio. Generative adversarial nets. Advances in Neural Information Processing Systems (NIPS 2014), pages 2672-2680, 2014.

J. Deng, W. Dong, R. Socher, L.-J. Li, K. Li, and L. Fei-Fei. Imagenet: A large-scale hierarchical image database. In IEEE Conference on Computer Vision and Pattern Recognition, 2009 (CVPR 2009), Miami, Florida, pages 248-255. IEEE 2009.

J. Long, E. Shelhamer, and T. Darrell. Fully Convolutional Networks for Semantic Segmentation. In Proceedings of the IEEE Conference on Computer Vision and Pattern Recognition (CVPR 2015), Boston, Mass., pages 3431-3440, IEEE 2015.

J. Masci, U. Meier, D. Ciresan, J. Schmidhuber, and G. Fricout. Steel Defect Classification with Max-Pooling Convolutional Neural Networks. The 2012 International Joint Conference on Neural Networks (IJCNN), Brisbane, Australia, pages 1-6. IEEE, Jun. 2012.

J. Redmon, S. Diwala, R. Girshick, and A. Farhadi. You Only Look Once: Unified, Real-Time Object Detection. Proceedings of the 2016 IEEE Conference on Computer Vision and Pattern Recognition (CVPR 2016), Las Vegas, Nevada, pages 779-788, IEEE 2016.

K. He, X. Zhang, S. Ren, and J. Sun. Deep Residual Learning for Image Recognition. In Proceedings of the IEEE Conference on Computer Vision and Pattern Recognition (CVPR 2016), Las Vegas, Nevada, pages 770-778, IEEE 2016.

K. Simonyan and A. Zisserman. Very Deep Convolutional Networks for Large-Scale Image Recognition. Submitted Sep. 4, 2014, for publication at 3d Int'l Conference on Learning Representations (ICLR 2015), San Diego, California. Presented May 7-9, 2015.

N. Srivastava, G. E. Hinton, A. Krizhevsky, I. Sutskever, and R. Salakhutdinov. Dropout: A Simple Way to Prevent Neural Networks from Overfitting. Journal of Machine Learning Research, 15(1):1929-1958, 2014.

S. Ioffe and C. Szegedy. Batch normalization: Accelerating deep network training by reducing internal covariate shift. In Proceedings of the 32nd International Conference on Machine Learning, Lille, France, pages 448-456, 2015.

T.-Y. Lin, A. RoyChowdhury, and S. Maji. Bilinear CNN Models for Fine-Grained Visual Recognition. Proceedings of the 2015 IEEE International Conference on Computer Vision (ICCV), Santiago, Chile, pages 1449-1457, IEEE 2015.

T.-Y. Lin, P. Goyal, R. Girshick, K. He, and P. Dollar. Focal Loss for Dense Object Detection. IEEE International Conference on Computer Vision (2017), pages 966-974, IEEE 2017.

Wadhwa, N., Rubinstein, M., Durand, F., and Freeman, W.T. "Phase-Based Video Motion Processing," MIT Computer Science & Artificial Intelligence Lab, ACM Transactions on Graphics, vol. 32, issue 4, New York, N.Y., Jul. 2013, 9 pages.

Y. Gao, O. Beijbom, N. Zhang, and T. Darrell. Compact bilinear pooling. In Proceedings of the IEEE Conference on Computer Vision and Pattern Recognition (CVPR 2016), Las Vegas, Nevada, pages 317-326, IEEE 2016.

Y. Liu, K. Gadepalli, M. Norouzi, G.E. Dahl, T. Kohlberger, A. Boyko, S. Venugopalan, A. Timofeev, P.Q. Nelson, G.S. Corrado, et al. Detecting Cancer Metastases on Gigapixel Pathology Images. Google Research, Mar. 8, 2017.

\* cited by examiner

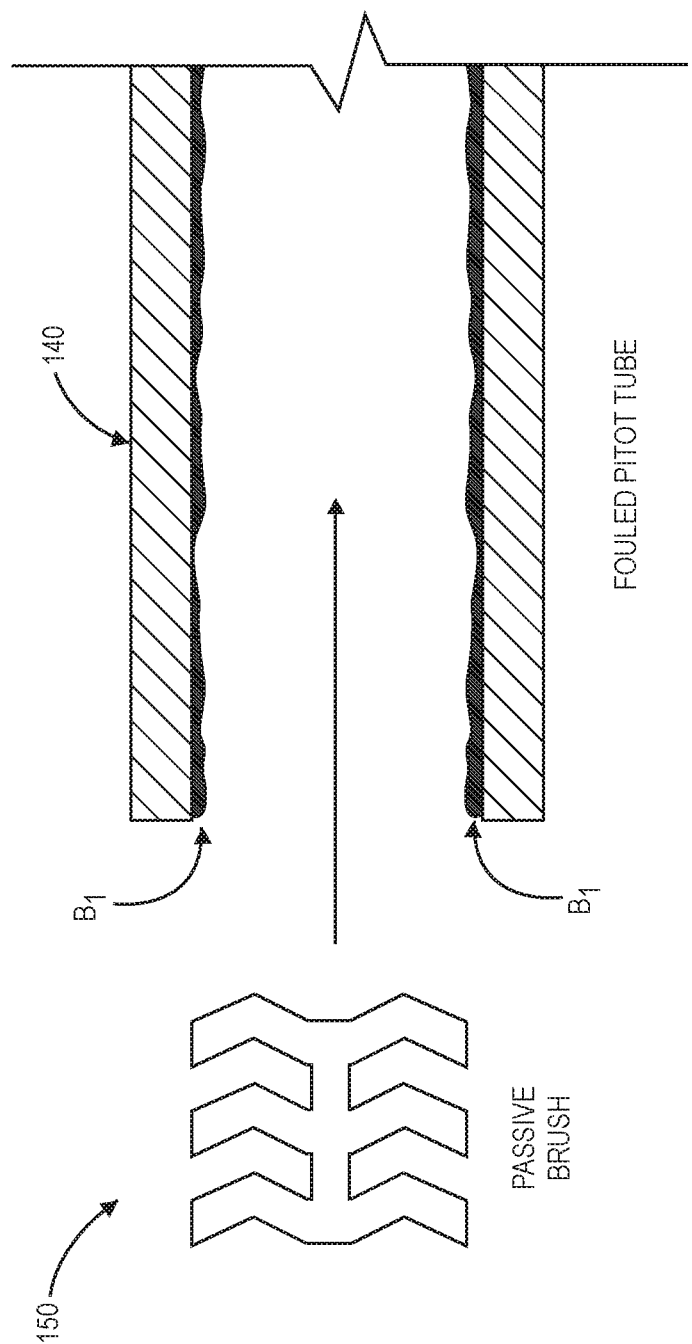

PASSIVE BRUSH INSERTED INTO FOULED PITOT TUBE

AERIAL VEHICLE SUBJECTED TO EXTERNAL
EXCITATION AT NATURAL FREQUENCY OF
PASSIVE BRUSH

PASSIVE BRUSH FORMED BY 3D PRINTING

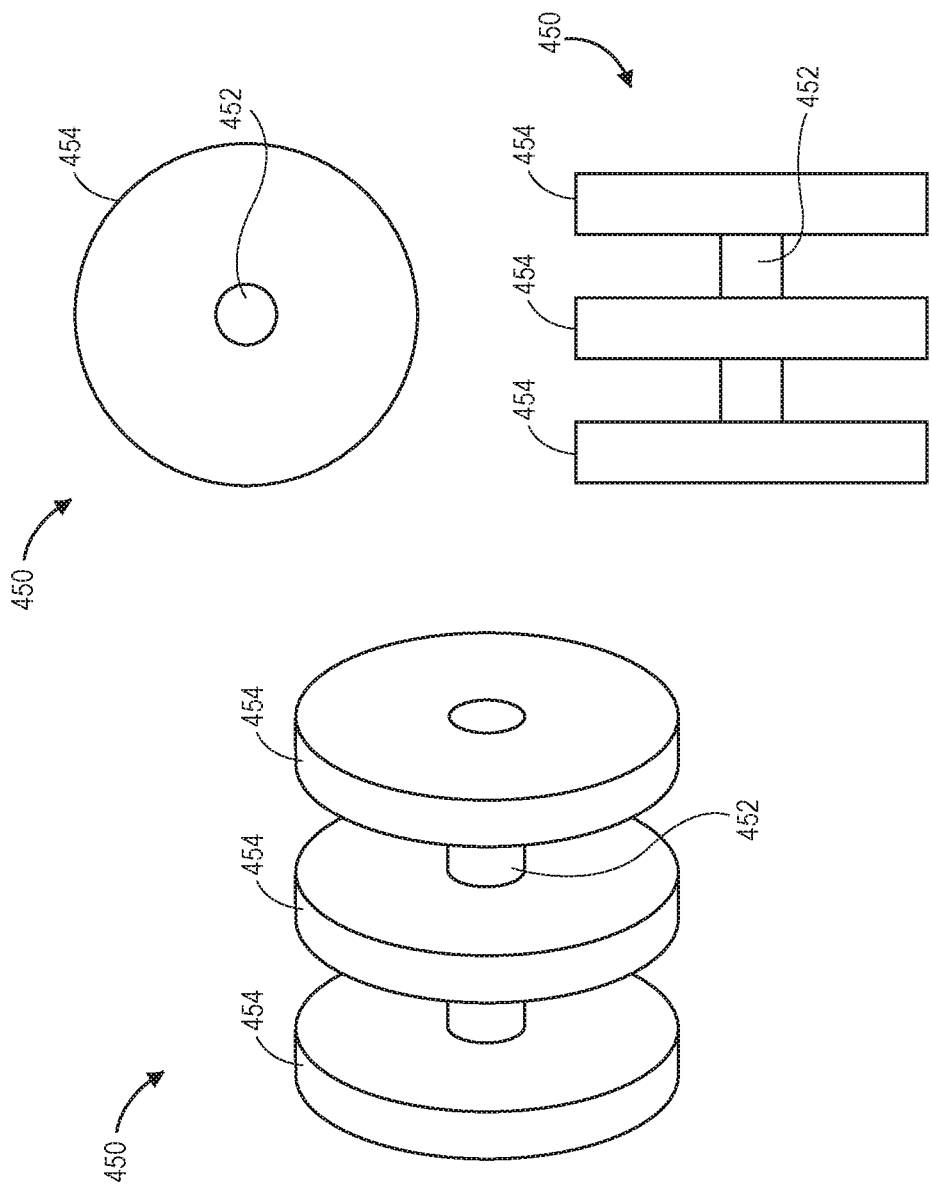

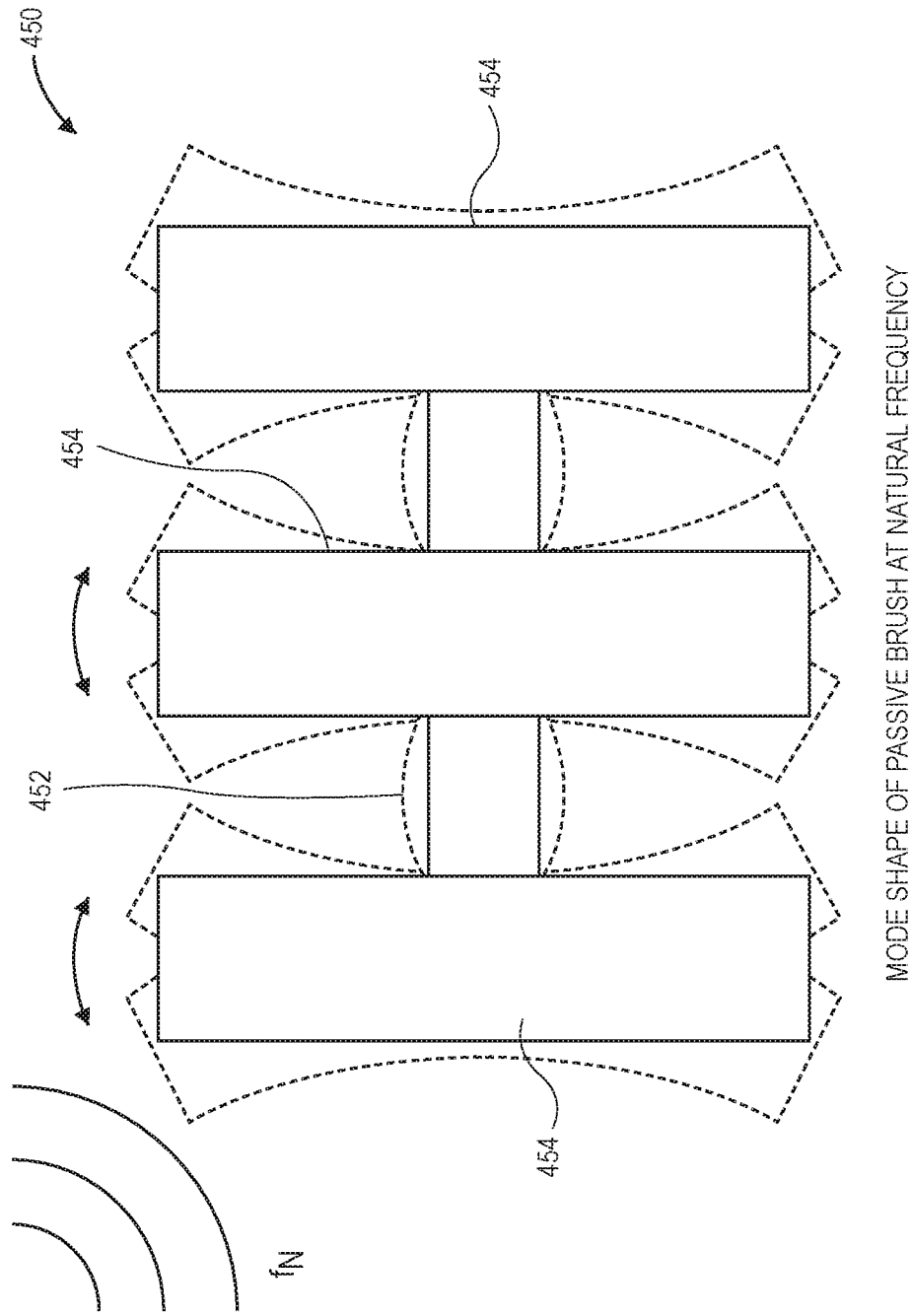

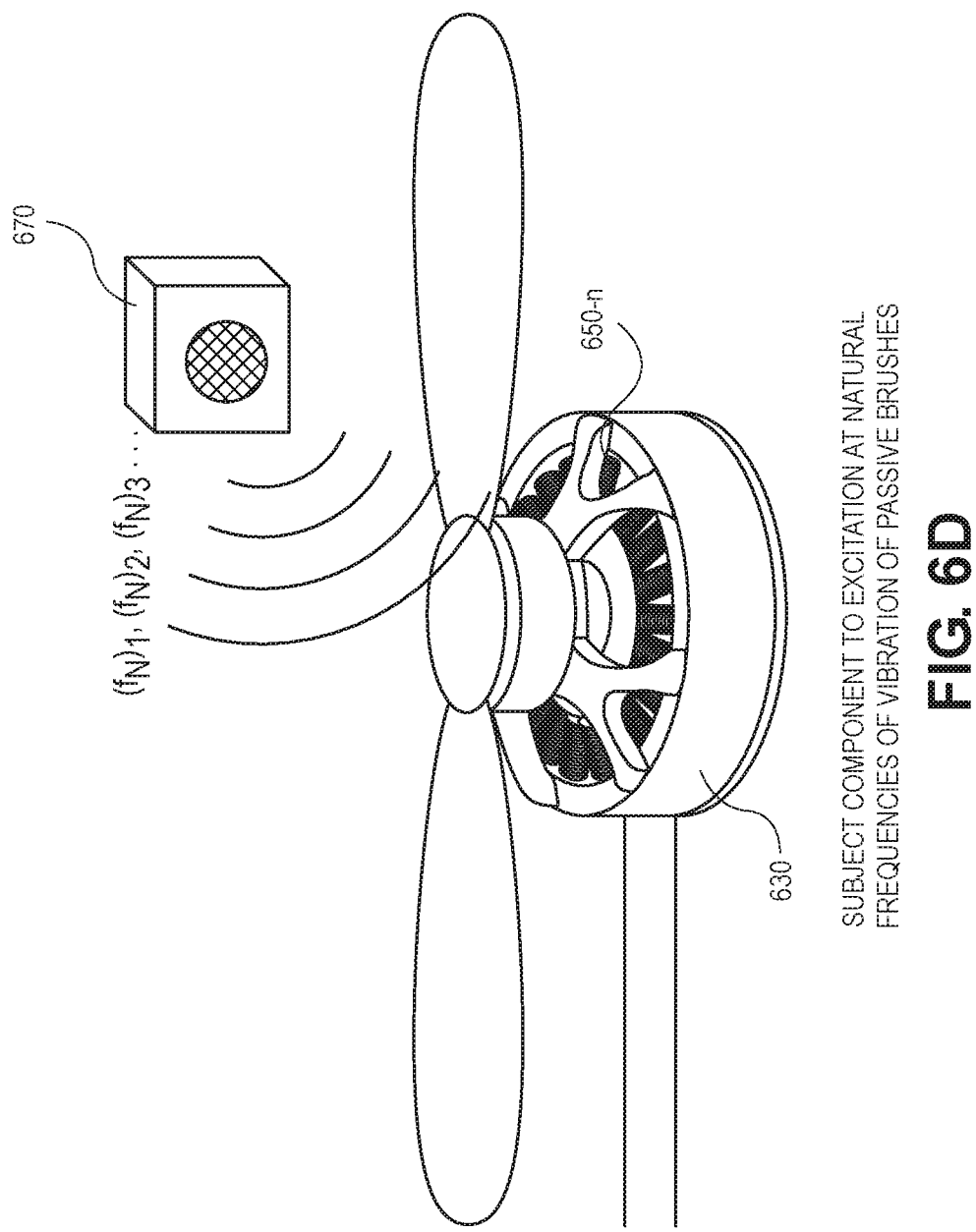

SUCTION APPLIED TO REMOVE PASSIVE BRUSHES AND RELEASED DEBRIS

US 11,794,222 B1

PASSIVE BRUSHES FOR CLEANING SURFACES IN THE PRESENCE OF ACOUSTIC EXCITATION

BACKGROUND

Typically, powered vehicles such as unmanned aerial vehicles or autonomous ground vehicles have any number of electronic or mechanical components. For example, an aerial vehicle may include a number of rotating, reciprocating or otherwise moving components that are powered by electricity, air, hydraulic power or other sources. Inevitably, such components will create or encounter debris or other foreign matter in the form of solids, liquids or airborne particulate matter or vapors. For example, because passing electric current through a conductor creates a magnetic field around the wire, components which feature a number of conductors carrying varying currents at predetermined voltage levels may be prone to attracting dust. Likewise, engines, motors or other machines which operate based on metal-to-metal contact often require lubricants in order to ensure their proper operation. For these reasons, and others, it is typically difficult to keep a vehicle, such as an unmanned aerial vehicle or an autonomous ground vehicle, clean and free of foreign matter.

Despite the many advantages that accompany the use of unmanned aerial vehicles or autonomous ground vehicles, keeping such vehicles clean and in an adequate operating condition remains a challenge. In most instances, when a vehicle requires cleaning or maintenance, human operators must use brushes, compressed air or other specific tools in order to loosen dirt, dust or other debris from the various openings, components, extensions and appurtenances of the vehicles. When the cleaning or maintenance is complete, human operators must use brooms, vacuums or other utensils to clean the loosened debris from the floor or other surroundings, and to place such debris in one or more appropriate receptacles. For these reasons, the costs (e.g., economic cost and man-hours) of maintaining vehicles in a clean and adequate operating condition may be substantial. Moreover, such vehicles are unable to provide value when they are taken out of service for such cleaning operations.

BRIEF DESCRIPTION OF THE DRAWINGS

FIGS. 1A through 1F are views of aspects of one system in accordance with embodiments of the present disclosure.

FIGS. 4A through 4E are views of aspects of one system in accordance with embodiments of the present disclosure.

FIGS. 6A through 6F are views of aspects of one system in accordance with embodiments of the present disclosure.

DETAILED DESCRIPTION

As is set forth in greater detail below, the present disclosure is directed to brushes that are passive in nature, e.g., unpowered or not physically controlled, and may be used to clean surfaces of components when the brushes are subjected to excitation at one or more natural frequencies of vibration. More specifically, the present disclosure is directed to passive brushes that may be inserted into, or placed alongside or adjacent to, openings (or cavities) or surfaces that are limited in size, have eccentric shapes or are otherwise not easily accessed by standard cleaning tools or techniques.

In some embodiments, passive brushes of the present disclosure may have any size or shape, and may include stems that are aligned along a longitudinal axis and fins or other components that extend outward from the stems. The passive brushes may be formed from plastics, rubbers or other materials in any manner, such as by one or more "3D printing" techniques (sometimes called "additive manufacturing" or "rapid prototyping"). Alternatively, one or more of the passive brushes disclosed herein may be formed according to one or more nanolithographic techniques. The passive brushes disclosed herein may have dimensions or shapes that are selected to enable the passive brushes to be inserted into, or placed alongside or adjacent to such openings or surfaces. The passive brushes may thus act in the manner of a spring-like object by receiving energy via external excitation and discharging the energy when in contact with the one or more openings or surfaces.

With one or more passive brushes inserted into openings of components of an aerial vehicle (or another machine), or provided alongside or adjacent to surfaces of such components, the aerial vehicle may be subjected to external excitation at one or more natural frequencies of vibration for the passive brushes, e.g., by acoustic energy for a predetermined period of time, to cause the passive brushes to vibrate within such openings, and to come into contact with any dirt, dust or other debris on surfaces of such openings. A natural frequency of vibration of a passive brush may be identified where a power level or an energy level of vibration of the passive brush is sufficiently greater than power levels or energy levels of vibration observed at other frequencies during the excitation. After the passive brushes and the aerial vehicle (or other machine) have been subjected to excitation at such natural frequencies, the passive brushes and any dirt, grime or other debris released from such surfaces may be removed from such openings in any manner, such as by manual agitation, or by suction or other means.

Figure 1A:
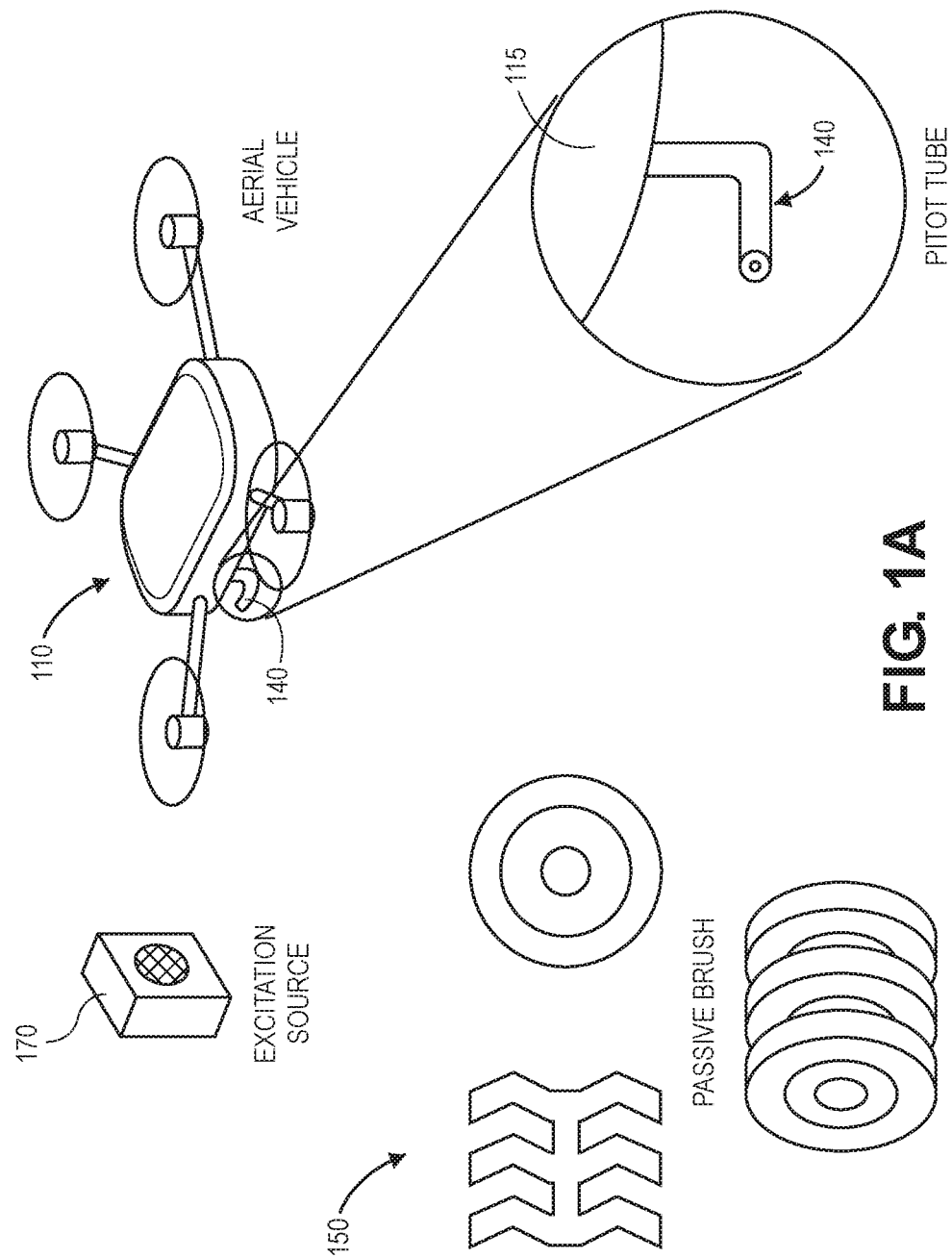

Referring to FIGS. 1A through 1F, views of aspects of one system in accordance with embodiments of the present disclosure are shown. As is shown in FIG. 1A, the system includes an aerial vehicle 110 (e.g., an unmanned aerial vehicle, or drone), a passive brush 150 and an excitation source 170 (e.g., an acoustic speaker). The aerial vehicle 110 includes a frame 115 having a pitot tube 140 extending from the frame 115, as well as a plurality of motors or other systems that are coupled to the frame 115 by extensions (or arms, appurtenances or other features). The pitot tube 140 may be associated with one or more systems or components for determining an air speed of the aerial vehicle 110 during operations, e.g., based on differential pressures. Because at least a portion of an open end of the pitot tube 140 extends outward from the frame 115, the pitot tube 140 may be fouled or otherwise affected by dirt, dust or other debris.

The excitation source 170 is aligned to project acoustic energy in the form of sounds having any frequency, wavelength or intensity upon one or more portions of the aerial vehicle 110. Alternatively, in lieu of the excitation source 170, or in addition to the excitation source 170, any other excitation source that is configured to excite the aerial vehicle 110 at known, selected frequencies with the aerial vehicle 110, e.g., by direct contact with the aerial vehicle 110 or in any other manner, may be utilized to impart excitation upon the aerial vehicle 110. For example, in some embodiments, one or more of the motors of the aerial vehicle 110 may act as an excitation source for the aerial vehicle 110, where such motors may be specifically controlled to impart excitation upon the aerial vehicle 110 at one or more selected frequencies within a known, defined range.

In some embodiments, the excitation source 170 may be programmed with an excitation schedule or other set of instructions by which acoustic energy may be projected at constant or varying intensities and over a defined range of frequencies, e.g., linearly, according to a step function, a delta function, or in any other manner.

As is also shown in FIG. 1A, the passive brush 150 has a substantially cylindrical shape, and includes a substantially horizontally aligned stem (or pipe) with a plurality of fans, e.g., round, substantially disc-shaped portions, that are mounted to the stem and extend radially outward from the stem. The fans of the passive brush 150 may be substantially planar or, as is also shown in FIG. 1A, non-planar in nature, and may be symmetrical or asymmetrical, with common or varying sizes. Alternatively, in some embodiments, the fans may be incomplete, or less than fully round or planar, disc-like objects. For example, in some embodiments, the various fans of the passive brush 150 may be segmented in nature, with extensions that are similar to blades of a propeller or sails of a windmill. The passive brush 150 may be formed from any materials, such as plastics or rubbers, that may have desired behavioral qualities in the presence of excitation at one or more natural frequencies.

Figure 1C:
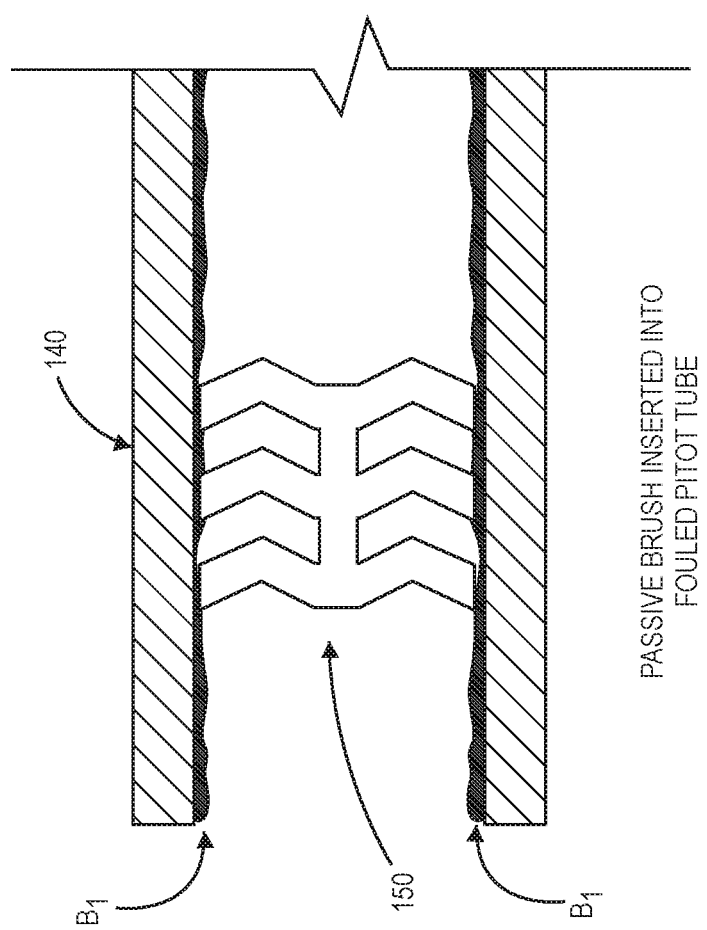

As is shown in FIG. 1B, the passive brush 150 is aligned for insertion into an end of the pitot tube 140, which is fouled with debris $B_1$. An outer diameter of the passive brush 150 is slightly less than, but approximately equal to, an internal diameter of the pitot tube 140, such that the passive brush 150 fits snugly within the pitot tube 140, with one or more perimetric edges of the fans of the passive brush 150 in contact with or adjacent to the interior surfaces of the pitot tube 140, e.g., snugly alongside such interior surfaces. Alternatively, the passive brush 150 may have any dimensions with respect to any dimensions of an interior of the pitot tube 140. As is shown in FIG. 1C, the passive brush 150 is inserted into the pitot tube 140. Alternatively, any number of passive brushes, including but not limited to the passive brush 150, may be inserted into the pitot tube 140.

Figure 1D:
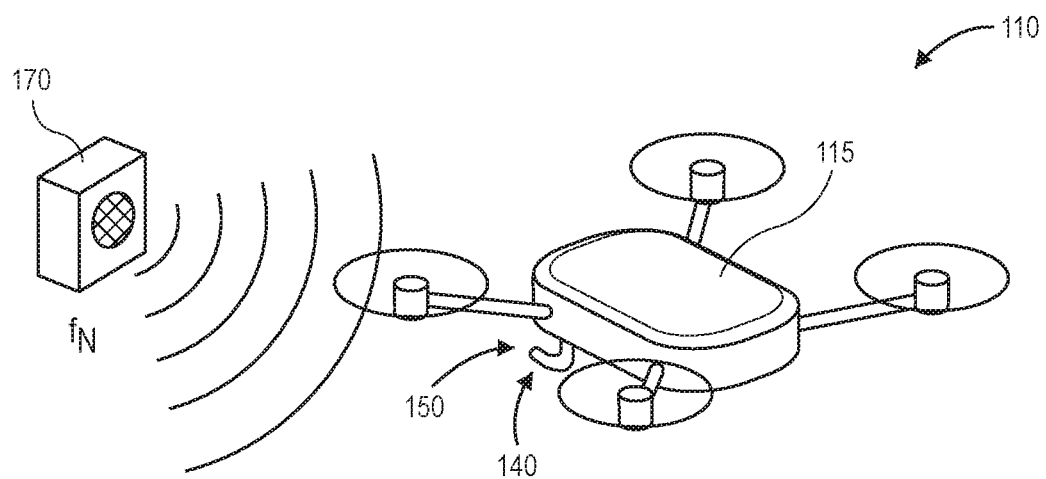

As is shown in FIG. 1D, with the passive brush 150 within the pitot tube 140, the aerial vehicle 110 is subjected to excitation at a natural frequency $f_N$ of the passive brush 150. The natural frequency $f_N$ of the passive brush 150 may be determined in any manner, such as by subjecting the passive brush 150 to excitation over a range of frequencies, and identifying one or more discrete frequencies at which powers or energies of vibration of the passive brush 150 are at local or absolute maximum levels. Alternatively, the natural frequency $f_N$ of the passive brush 150 may be determined by subjecting a passive brush that is substantially identical to the passive brush 150 (e.g., of common sizes, shapes and dimensions, and formed from common materials), to excitation over the range of frequencies, and identifying one or more discrete frequencies at which powers or energies of vibration of the passive brush 150 are at local or absolute maximum levels. One or more of such discrete frequencies may be determined to be a natural frequency of vibration, viz., the natural frequency $f_N$, and associated with the passive brush 150. Moreover, where multiple natural frequencies of the passive brush 150 are determined, the natural frequency $f_N$ may be selected based on a mode shape or other metric or indicia of behavior of the passive brush 150 at such frequencies. Alternatively, the aerial vehicle 110 may be subjected to excitation at any of the natural frequencies of the passive brush 150.

Figure 1E:
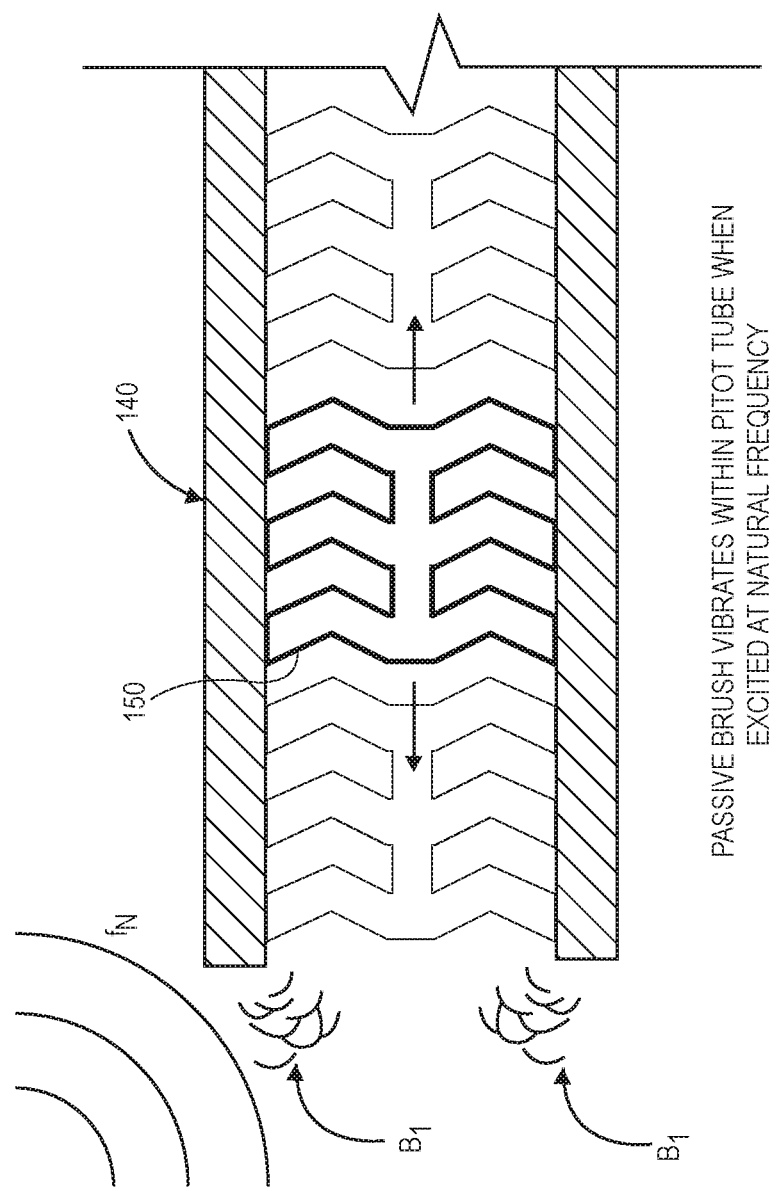
Figure 1F:
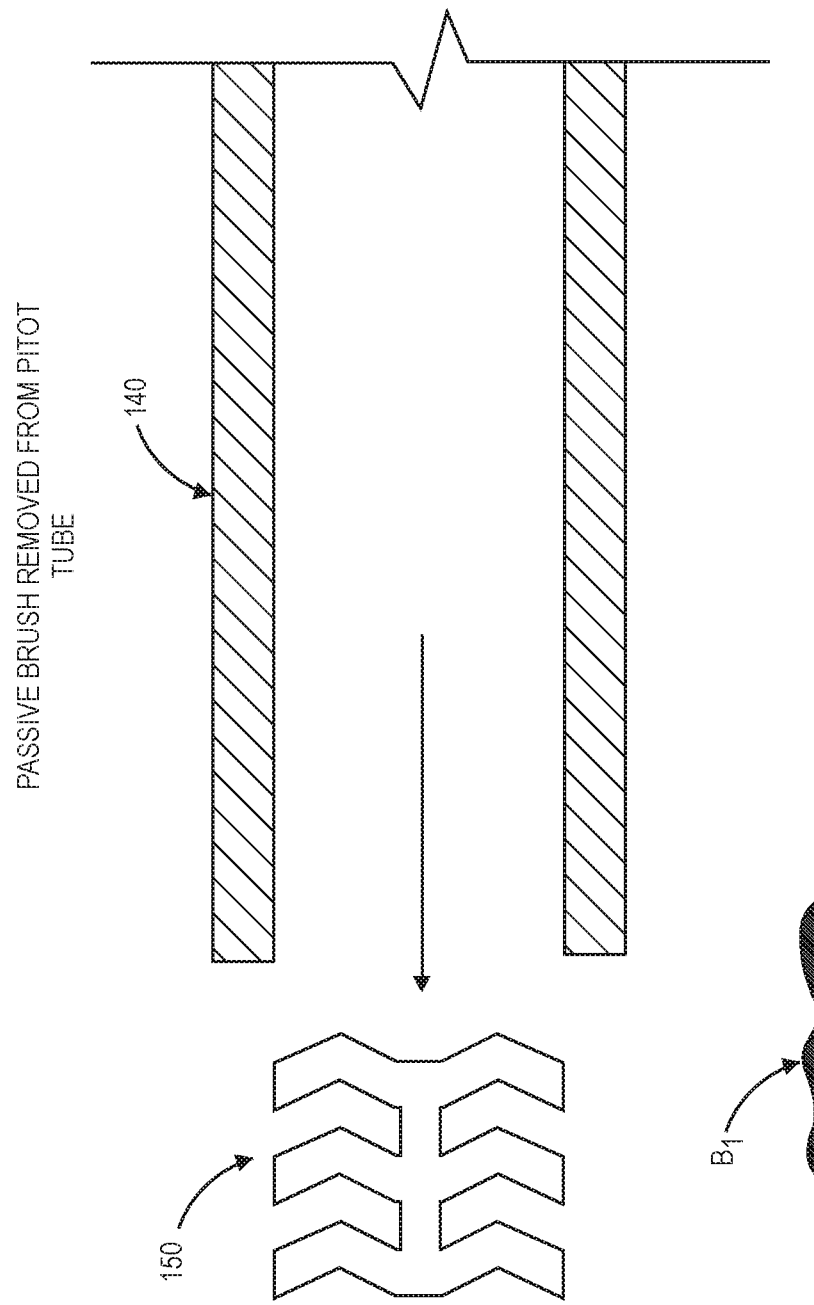

As is shown in FIG. 1E, with the aerial vehicle 110 subjected to excitation at the natural frequency $f_N$, the physical response of the passive brush 150 to the excitation causes one or more fins or other portions of the passive brush 150 to contact the internal surfaces of the pitot tube 140, thereby scraping, contacting, or otherwise abrading the debris $B_1$ on such surfaces, and releasing some or all of the debris $B_1$ therefrom. As is shown in FIG. 1F, when the passive brush 150 is removed from the pitot tube 140, some or all of the debris $B_1$ has been released from the interior surfaces of the pitot tube 140, and removed therefrom. The passive brush 150 may then be cleaned or otherwise prepared for subsequent insertion into the pitot tube 140, or for placement alongside one or more other surfaces of components that may be fouled by dirt, dust or other debris. The passive brush 150 may be removed from the pitot tube 140 in any manner, such as by manual agitation or other interaction, e.g., inverting the pitot tube 140, or by applying suction to the end of the pitot tube 140, or in any other manner.

Accordingly, by forming one or more appropriately sized passive brushes from plastics, rubbers or other suitable materials, and placing such passive brushes adjacent to surfaces that may be fouled with dirt, dust or other debris, the passive brushes may be utilized to release some or all of such debris from such surfaces by subjecting the passive brushes to excitation at one or more natural frequencies of vibration.

The passive brushes of the present disclosure may be formed in any manner, such as by one or more 3D printing or nanolithographic techniques, and may have any sizes or shapes. For example, the passive brushes of the present disclosure may include one or more stems (or pipes) that are aligned substantially longitudinally, and may include any number of fans or other features that extend radially outward from such stems. The fans may be symmetrical or asymmetrical in nature, and may be planar or non-planar, or have any other shapes, e.g., segmented components with a plurality of radial extensions. Aspects of the passive brushes disclosed herein may be selected or designed for components in general or for a general application, or for a specific component or a specific application. For example, in some embodiments, the sizes, shapes or other aspects of the passive brushes, including but not limited to the materials from which the passive brushes are formed, may be selected based on an intended component or substance to be cleaned from the component, e.g., a specific type or form of dirt, dust, debris or liquids, such as oils, or for one or more clogs or blockages.

Vehicles such as aerial vehicles (e.g., unmanned aerial vehicles, or drones) or ground vehicles (e.g., autonomous mobile robots) are essential tools in many modern working environments. However, most vehicles require regular or spot maintenance, and are difficult to keep clean. Because vehicles typically encounter various types of debris or other foreign matter in solid (e.g., dirt and dust, as well as feed, gravel, rock, sand or woodchips), liquid (e.g., water, oils or petroleum-based liquids) or gaseous (e.g., air containing particulate matters or vapors) form, which may accumulate in one or more openings or cavities or on surfaces of components of such vehicles, and because many components of such vehicles are prone to generating or attracting such debris, many vehicles commonly require periodic cleaning or other procedures in order to ensure that the vehicles are operating in a safe and acceptable condition.

Presently, vehicles are typically cleaned by human workers using hand-held sources of pressurized or blowing fluids (e.g., air or water), along with one or more brushes. Cleaning vehicles in this manner are sometimes effective because a human worker may manually direct a fluid outlet or other air source toward a specifically targeted region of the vehicle, such as a grate or other vent area, a wheel well, or any other portion of the vehicle that is observed or known to include or attract dirt, dust or other foreign matter. Manual cleaning operations and procedures may be time-consuming and expensive, however, in terms of human capital and also the downtime lost while the vehicle being cleaned is taken out of service. Furthermore, where vehicle components include openings or cavities that are small and not readily accessible, manual cleaning operations may be of limited effectiveness.

The systems and methods of the present disclosure may be provided to automatically perform cleaning operations on a vehicle or other system having one or more openings, cavities or surfaces that may be fouled by dirt, dust or other debris, such as an aerial vehicle, by inserting passive brushes into such openings or cavities, or providing the passive brushes adjacent to or alongside one or more of such surfaces, and subjecting the passive brushes and such surfaces to excitation (e.g., acoustic excitation) at one or more natural frequencies of the passive brushes. The physical response of the passive brushes disclosed herein to the excitation may cause one or more portions of such brushes to contact the openings, the cavities or the surfaces, thereby releasing dirt, dust or other debris. The passive brushes may have any sizes or shapes and may be formed from materials that may be specifically selected for use in association with such openings, such cavities or such surfaces. Natural frequencies of vibration may be identified where power levels or energy levels of vibration are sufficiently greater than at other frequencies during the excitation, and a mode shape in the form of a curve characterizing the extent to which such objects vibrate or move at the natural frequencies may also be identified. Alternatively, natural frequencies of the passive brushes, or mode shapes of the passive brushes at such frequencies, may be identified in any other manner.

Any number of the passive brushes disclosed herein may be placed into an opening or a cavity, or alongside or adjacent to a surface, and subjected to excitation at any number of the natural frequencies of the passive brushes. Moreover, the passive brushes may be inserted into or removed from an opening or a cavity, or placed alongside or adjacent to a surface, in any manner. For example, in some embodiments, the passive brushes may be manually inserted into openings or cavities, or placed alongside or adjacent to surfaces. In some embodiments, each of the passive brushes that are placed into an opening or a cavity, or alongside or adjacent to a surface, and subjected to excitation, may be of the same type or kind, such that each of the passive brushes is of the same or similar (e.g., nominal) size, shape, dimensions or mass. In some embodiments, two or more types or kinds of passive brushes, e.g., passive brushes having two or more (e.g., nominal) sizes, shapes, dimensions, or masses, may be placed into an opening or a cavity, or alongside or adjacent to a surface, and subjected to excitation at the natural frequencies of each of the types or kinds of passive brushes. For example, where openings or surfaces that require cleaning in accordance with embodiments of the present disclosure have different dimensions, passive brushes that may be accommodated within the respective openings or on the respective surfaces may be utilized. Alternatively, where two or more types or kinds of substances are to be cleaned from an opening or surface, types or kinds of passive brushes that are well-suited for cleaning each of the types or kinds of substances may be placed into the opening or the cavity, or alongside or adjacent to the surface, and subjected to excitation at the natural frequencies of each of the types or kinds of passive brushes. The number, type or kind of passive brushes that may be utilized in accordance with embodiments of the present disclosure, or the natural frequencies of such passive brushes, are not limited.

Whether an object having one or more surfaces requires cleaning in accordance with one or more embodiments of the present disclosure may be determined by subjecting the object to excitation over a range of frequencies, and determining whether a response of the object to the excitation is consistent with a vibrometric signature of the object. A vibrometric signature of an object, or a set of natural frequencies of vibration of the object, may be determined by subjecting the object to excitation across a range of frequencies, and capturing images of the object during the excitation or otherwise determining a response of the object to the excitation. Natural frequencies of vibration or natural vibrational modes may be determined for surfaces of the object by analyzing differences in pixel intensities (e.g., blurring) across consecutive image frames, or in any other manner. For example, in some embodiments, an object (e.g., a joint, a junction or another component of the object, or the object as a whole) may be subjected to excitation over a range of frequencies, e.g., by an acoustic speaker, or by direct contact with the object. Imaging data captured during the excitation using a substantially high-speed camera or other imaging device, e.g., at or above frame rates of two thousand to four thousand frames per second (2,000 to 4,000 fps), or at any other frame rates, may be processed. One or more image pixels (or, simply, pixels) within the imaging data may be selected, and intensities (e.g., colors) of the image pixels across multiple images may be determined. Changes in the intensities of the selected image pixels may be processed to determine vibrations of the object across the range of frequencies, and to identify the natural frequencies or natural vibrational modes of the object. For example, natural frequencies of vibration may be identified where the power level or energy level of vibration, or deviations in intensities or positions of the pixels, are sufficiently greater than at other frequencies during the excitation.

A vibrometric signature may be compared to other vibrometric signatures to make one or more determinations regarding integrity, suitability or fitness of the object. For example, a vibrometric signature may be determined for a vehicle or one or more components thereof that are known to be in a clean or compliant condition (e.g., free of fouling such as dirt, dust or other debris), and may act as a baseline or standard for the vehicle. Subsequently, such as after the vehicle has completed one or more missions or other operations, the vehicle may be subjected to excitation over a range of frequencies, and a vibrometric signature may be determined based on the response of the vehicle to such excitation. The vibrometric signature determined for the vehicle following the missions or other operations may be compared to the baseline vibrometric signature for the vehicle that was determined when the vehicle was known to be in the clean or compliant condition, to determine whether the vehicle remains clean or otherwise compliant, or whether cleaning or other maintenance may be required. For example, because an object, such as a vehicle, may exhibit different responses to excitation based on whether the object is clean or is fouled by dirt, dust or other debris, a non-negligible difference between the vibrometric signatures may indicate whether the object remains clean or compliant, or whether the object requires cleaning or other maintenance.

If a difference between the vibrometric signatures indicates that a vehicle requires cleaning or other maintenance, one or more surfaces of the vehicle may be placed into contact with one or more passive brushes of the present disclosure, and the vehicle and the passive brushes may be subjected to excitation at known natural frequencies of the passive brushes. After the vehicle and the passive brushes have been subjected to the excitation at the natural frequencies of the passive brushes, the passive brushes may be removed from the vehicle, e.g., by manual agitation, suction or other means or techniques. In some embodiments, the passive brushes may be removed from the vehicle by subjecting the passive brushes to excitation at a selected frequency, e.g., a selected natural frequency of vibration, that is known to preferentially induce or initiate travel by way of vibration. In some other embodiments, the passive brushes may be removed from the vehicle by subjecting the passive brushes to an electrostatic, attractive charge. The passive brushes may be removed from a vehicle or any surface thereof in any manner in accordance with embodiments of the present disclosure. Thereafter, the vehicle may again be subjected to excitation over a range of frequencies to determine a vibrometric signature of the vehicle following the cleaning by way of the passive brushes.

Any differences between the vibrometric signature so determined and the baseline vibrometric signature may indicate that the surfaces were not adequately cleaned or are otherwise non-compliant, or that one or more passive brushes have not been removed from such surfaces. Therefore, the surfaces of the vehicle may again be placed into contact with one or more passive brushes of the present disclosure, and the vehicle and the passive brushes may be subjected to excitation at known natural frequencies of the passive brushes, in order to further clean such surfaces again by way of the passive brushes, or further manual agitation, suction or other means (e.g., electrostatic charge) may be applied to the vehicle in order to remove any remaining passive brushes therefrom.

Such processes may be repeated on any number of occasions, as necessary, until a vibrometric signature determined by subjecting the vehicle or one or more components thereof to excitation over a range of frequencies is consistent with the baseline vibrometric signature.

The use of passive brushes in accordance with embodiments of the present disclosure is not limited to cleaning openings, cavities or surfaces of vehicles, such as aerial vehicles or ground vehicles. Rather, passive brushes may be placed within openings or cavities, or alongside surfaces, of any objects that may be fouled with dirt, dust or other debris, including solids and/or liquids. For example, in some embodiments, passive brushes may be placed alongside or adjacent to a mobile device (e.g., a smartphone, a tablet computer, a smart watch, or others), in any number, and subjected to excitation at one or more natural frequencies. The passive brushes may effectively clean the mobile device, in the absence of water, when the passive brushes are excited at the one or more natural frequencies, and may remove any fouling substances therefrom.

Figure 2:
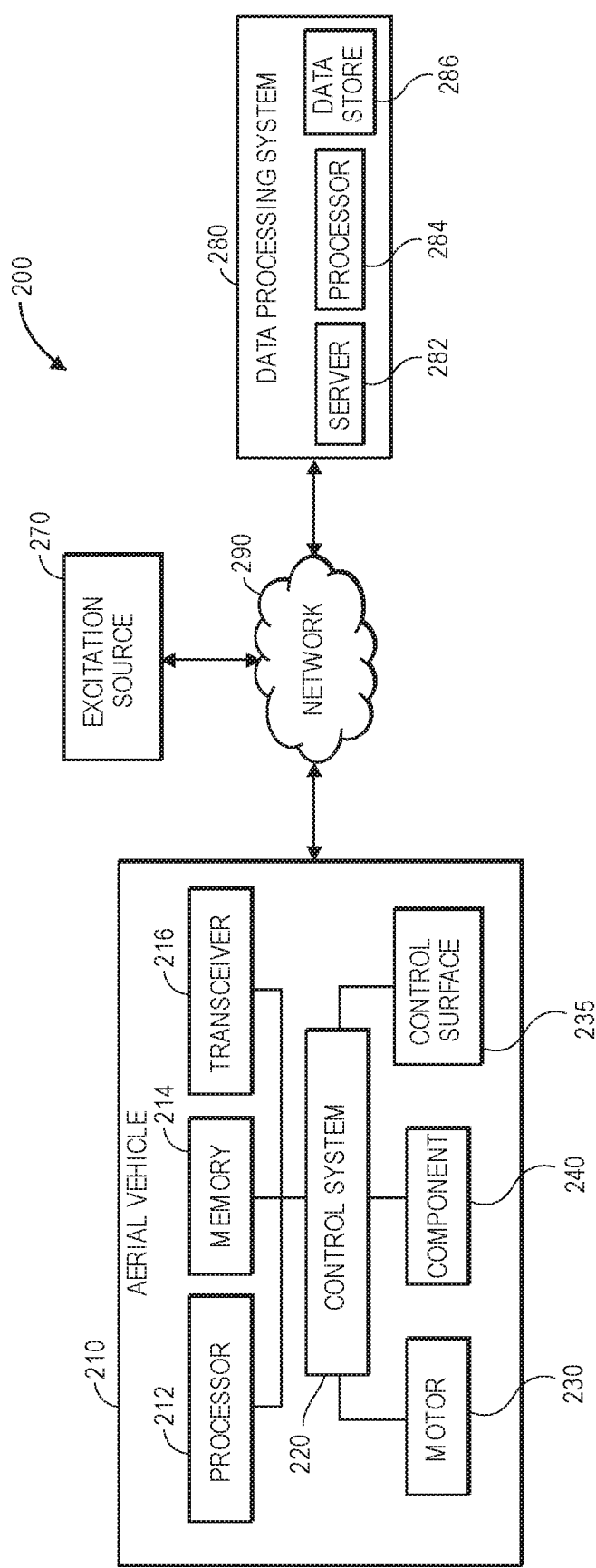
FIG. 2 is a block diagram of one system in accordance with embodiments of the present disclosure.

Referring to FIG. 2, a block diagram of components of one system 200 in accordance with embodiments of the present disclosure is shown. The system 200 of FIG. 2 includes an aerial vehicle 210, an excitation source 270 and a data processing system 280 connected to one another over a network 290. Except where otherwise noted, reference numerals preceded by the number "2" shown in the block diagram of FIG. 2 indicate components or features that are similar to components or features having reference numerals preceded by the number "1" shown in FIGS. 1A through 1F.

The aerial vehicle 210 includes a processor 212, a memory 214 and a transceiver 216. The aerial vehicle 210 further includes a control system 220, one or more propulsion motors 230, one or more control surfaces 235, and one or more components 240.

The processor 212 may be configured to perform any type or form of computing function associated with the operation of the aerial vehicle 210, including but not limited to the execution of one or more machine learning tools, algorithms or techniques. The processor 212 may also be configured to execute any other algorithms or techniques associated with one or more applications, purposes or functions, or to select at least one of a course, a speed or an altitude for the safe operation of the aerial vehicle 210. For example, the processor 212 may be configured to control any aspects of the operation of the aerial vehicle 210 and the one or more computer-based components thereon, including but not limited to the propulsion motors 230, the control surfaces 235 or the components 240.

The processor 212 may also control the operation of one or more control systems or modules, such as the control system 220, for generating instructions for conducting operations of one or more of the propulsion motors 230, one or more of the control surfaces 235, or one or more of the components 240, e.g., to interpret data captured by one or more onboard sensors (not shown). Such control systems or modules may be associated with one or more other computing devices or machines, and may communicate with the excitation source 270, the data processing system 280 or one or more other computer devices or aerial vehicles (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the propulsion motors 230 or the control surfaces 235, or any other devices or components (not shown). The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the propulsion motors 230 or the control surfaces 235, or other components, such as to cause one or more of the propulsion motors 230 to rotate propellers at desired speeds, or to cause such propellers to be aligned in selected positions or orientations. The control system 220 may further control any other aspects of the aerial vehicle 210, including but not limited to the operation of one or more aspects of the control surfaces 235 or other features within desired ranges or by desired distances or deflections, or the operation of one or more of the components 240 (not shown). In some embodiments, the control system 220 may be integrated with one or more of the processor 212, the memory 214 and/or the transceiver 216.

The propulsion motors 230 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some embodiments, one or more of the propulsion motors 230 may be a brushless direct current (or "DC") multi-phase motor such as an outrunner brushless motor or an inrunner brushless motor.

The aerial vehicle 210 may include any number of propulsion motors 230 of any kind. For example, one or more of the propulsion motors 230 may be aligned or configured to provide forces of lift to the aerial vehicle 210, exclusively, while one or more of the propulsion motors 230 may be aligned or configured to provide forces of thrust to the aerial vehicle 210, exclusively. Alternatively, one or more of the propulsion motors 230 may be aligned or configured to provide forces of lift and forces of thrust to the aerial vehicle 210, as needed. For example, the propulsion motors 230 may be fixed in their orientation on the aerial vehicle 210, or configured to vary their respective orientations, e.g., a tilt-rotor aircraft. Moreover, the propulsion motors 230 may be aligned or configured to operate with different capacities or ratings, or at different speeds, or coupled to propellers having different sizes and shapes. For example, in some embodiments, one or more of the propulsion motors 230 may be an electric motor, and one or more of the propulsion motors 230 may be a gasoline-powered motor.

Each of the propulsion motors 230 may be coupled to one or more propellers (or rotors or rotatable systems) having a plurality of shaped blades joined to a hub or boss. For example, each of such propellers may be rotatably mounted to a mast or shaft associated with a respective one of the propulsion motors 230 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The control surfaces 235 may be any sections or appurtenances provided on surfaces of the aerial vehicle 210 that may be manipulated in order to dynamically modify a position or orientation of the aerial vehicle 210 with respect to one or more degrees of freedom. For example, the control surfaces 235 may include, but are not limited to, ailerons, brakes, elevators, elevons, flaps, rudders, slats, tailerons or wings, or other features. In some embodiments, each of the control surfaces 235 may include a motor, such as an electrical, mechanical and/or hydraulic or other component or actuator for rotating, translating or otherwise repositioning or reorienting a respective one of the control surfaces 235 during operation of the aerial vehicle 210, under the control of the one or more processors 212 or the control system 220. In some embodiments, each of the control surfaces 235 may include a directional sensor, such as any type of sensor or other component that is embedded into one or more aspects of one of the control surfaces 235 (e.g., a leading edge, a trailing edge, a tip or one or more other faces or aspects of such surfaces 235) and configured to gather information or data with respect to an alignment or orientation thereof.

The components 240 may be any structures, features or systems provided aboard the aerial vehicle 210, e.g., partially or entirely within the aerial vehicle 210 or external to the aerial vehicle 210. The components 240 may have one or more openings or cavities into which passive brushes of the present disclosure may be inserted. In some embodiments, the components 240 may be or include one or more pitot tubes, antennas, transmitters, receivers, ventilation ducts (e.g., intakes or exhausts), imaging devices (e.g., color cameras, grayscale cameras, black-and-white cameras, depth sensors, range cameras, infrared cameras, radiographic cameras or other optical sensors), actuators, brackets, fuselages, joints, junctions, landing gear, struts or other components or features that may be mounted to component parts of a frame, or to one or more component parts mounted to the frame. The components 240 may further include one or more compasses, speedometers, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones). The types of components 240 that may be cleaned using one or more passive brushes of the present disclosure are not limited, and may include, but need not be limited to, one or more of the motors 230 or the control surfaces 235, or components thereof.

The propulsion motors 230, the control surfaces 235, or the components 240 may be coupled to a frame or other structure or surface of the aerial vehicle 210, or to any other object, by one or more joints or junctions (or other connectors or connections). Such joints or junctions may be defined or formed in any manner and by any components or techniques including but not limited to nuts and/or bolts, clips, rivets, fasteners, adhesives or welds. Additionally, although the block diagram of FIG. 2 includes a single box for a propulsion motor 230, a single box for a control surface 235 and a single box for a component 240, those of ordinary skill in the pertinent arts will recognize that any number or type of propulsion motors, control surfaces and/or components may be provided aboard the aerial vehicle 210 in accordance with the present disclosure, and that such propulsion motors 230, such control surfaces 235, or such components 240, or any other components may be joined or coupled to a frame or to one another by any number of joints or junctions.

The excitation source 270 may be any device or system configured to impart energy (e.g., sound energy) over a range of frequencies onto one or more objects, such as the aerial vehicle 210, the motors 230, the control surfaces 235 or the components 240, or any other objects, including but not limited to one or more of the passive brushes described herein. For example, the excitation source 270 may be any type or form of speaker or like system having one or more transducers for converting electrical signals into sound energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters. Alternatively, in some embodiments, the excitation source 270 may be any other system or component for imparting vibration energy onto one or more surfaces of an object, such as the propulsion motors 230, the control surfaces 235, the components 240 or any other aspects of the aerial vehicle 210, e.g., by direct contact with the object or in any other manner. Moreover, in some embodiments, the excitation source 270 may be an intrinsic component of the aerial vehicle 210, such as one or more of the propulsion motors 230. The excitation source 270 may further include any number of processors or other components for communicating with one or more of the aerial vehicles 210 and/or the data processing system 280 over the network 290, as well as any number of power supplies of any type or form.

The data processing system 280 includes one or more physical computer servers 282 having one or more computer processors 284 and one or more data stores 286 associated therewith, and may be provided for any specific or general purpose. For example, the data processing system 280 of FIG. 2 may be independently provided for the exclusive purpose of receiving, analyzing or storing information or data received from the aerial vehicle 210 or the excitation source 270, or from any other source, including but not limited to sets of data regarding natural frequencies of vibration of passive brushes. Alternatively, the data processing system 280 of FIG. 2 may be provided in connection with one or more physical or virtual services configured to receive, analyze or store such information or data, as well as one or more other functions.

In some embodiments, the data processing system 280 may be configured to program one or more excitation sources 270 to emit energy (e.g., acoustic energy, or sound) at any intensity and over a range of frequencies. For example, the data processing system 280 may program the one or more excitation sources 270 to emit energy in a linearly increasing manner, e.g., in a stepwise fashion, such that the frequency of the energy being emitted remains constant for a brief period of time before being increased or decreased to another frequency. In still other embodiments, the data processing system 280 may be configured to associate power levels or energy levels of vibration with frequencies of excitation, or to identify one or more natural frequencies of vibration on any basis.

The servers 282 may be connected to or otherwise communicate with the processors 284 and the data stores 286. The data stores 286 may store any type of information or data, including but not limited to information or data received from the aerial vehicle 210 or the excitation source 270, for any purpose. The servers 282 and/or the computer processors 284 may also connect to or otherwise communicate with the network 290, through the sending and receiving of digital data. For example, the data processing system 280 may include any facilities, stations or locations having the ability or capacity to receive and store information or data, such as media files, in one or more data stores, e.g., media files received from the aerial vehicle 210, or from one another, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210. In some embodiments, the data processing system 280 may be configured to program the excitation source 270 to excite an object, as necessary.

Any of the functions or processes described herein as being performed, or capable of being performed, by the processor 212 or the server 282 may, in accordance with one or more embodiments disclosed herein, be performed by any or all of the processor 212 or the server 282, or one or more other computer devices or systems. For example, the programming or operation of the excitation source 270 to excite an object, or to capture data as described herein, may be configured or controlled by any or all of the processor 212 or the server 282. Likewise, the generation of power spectral densities, the identification of natural frequencies, or the determination of amplitudes or phases of vibration or other motion may be performed by any or all of the processor 212 or the server 282. Finally, the determination of mode shapes for one or more objects may also be made by any or all of the processor 212 or the server 282.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210, the excitation source 270 or the data processing system 280 may use any web-enabled or Internet applications or features, or any other client-server applications or features including E-mail or other messaging techniques, to connect to the network 290, or to communicate with one another. For example, the aerial vehicle 210 may be adapted to transmit information or data in the form of synchronous or asynchronous messages to the data processing system 280 or to any other computer device in real time or in near-real time, or in one or more offline processes, via the network 290. Those of ordinary skill in the pertinent art would recognize that the aerial vehicle 210, the excitation source 270 or the data processing system 280 may operate, include or be associated with any of a number of computing devices that are capable of communicating over the network 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212, the processor 284, or any other computers or control systems utilized by the aerial vehicle 210, the excitation source 270 or the data processing system 280, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Those of ordinary skill in the pertinent arts will recognize that passive brushes of the present disclosure may be excited and used to clean one or more surfaces of any type or form of components 240, and that such components 240 need not be associated with an aerial vehicle. For example, such components may be associated with a ground vehicle, which may be manned or unmanned (e.g., an autonomous mobile robot), or with any other device or system. One or more passive brushes may be placed into contact with surfaces of such components, and excited at one or more natural frequencies of the passive brushes, e.g., by the excitation source 270.

Figure 3:
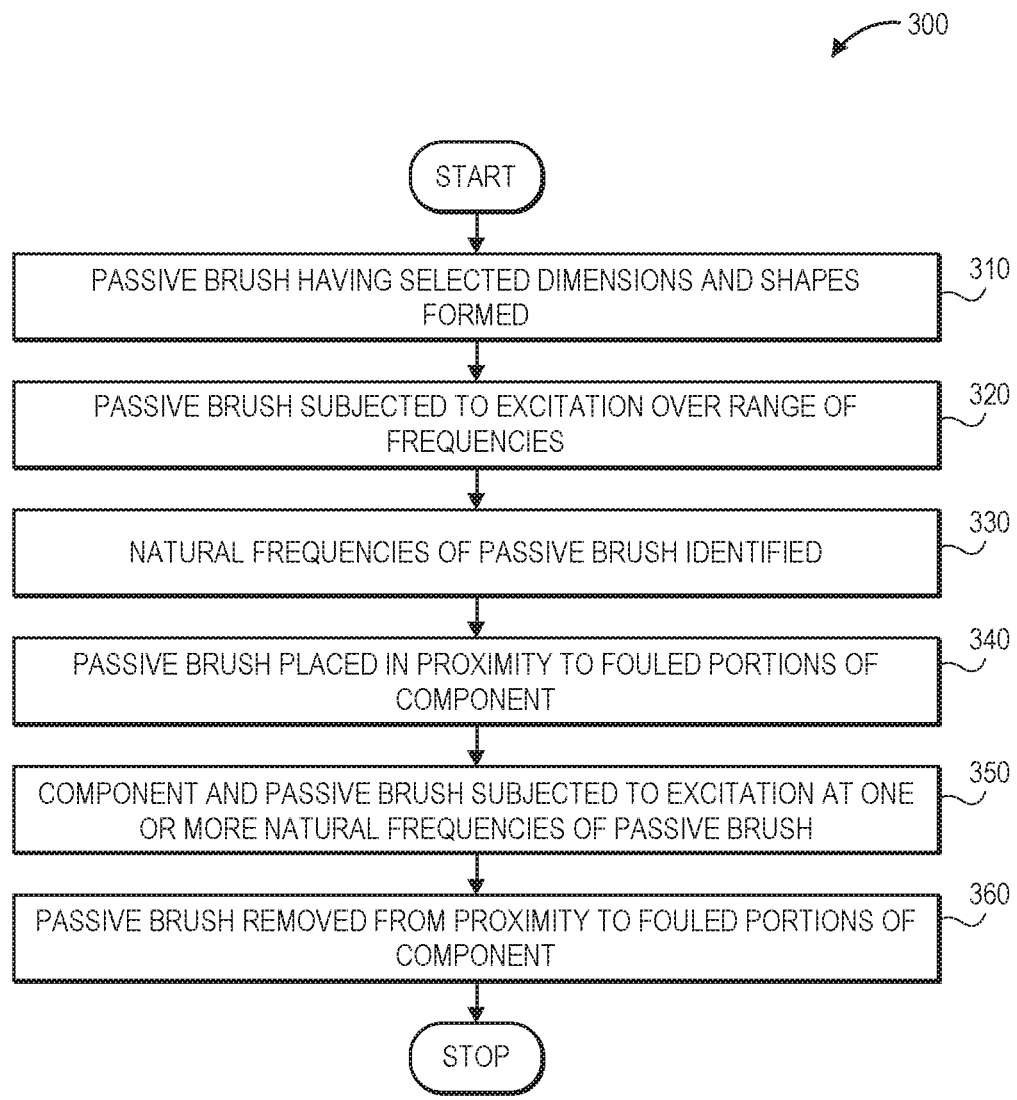
FIG. 3 is a flow chart of one process in accordance with embodiments of the present disclosure.

Referring to FIG. 3, a flow chart 300 of one process in accordance with embodiments of the present disclosure is shown. At box 310, a passive brush having one or more selected dimensions and shapes is formed. For example, referring again to FIG. 1A, a passive brush may have a substantially linear or cylindrical construction, with a substantially longitudinal stem (or pipe) having one or more fans, e.g., partially or fully disc-shaped portions that are mounted to the stem and extend radially outward from the stem. The fans of the passive brush may be symmetrical or asymmetrical in nature, and may have common or varying sizes. Moreover, a passive brush constructed with one or more stems and one or more fans may define a substantially symmetrical object, such as the passive brush 150 shown in FIG. 1A, a substantially asymmetrical object, or an object having any other shape.

The passive brushes of the present disclosure may be formed from any materials, and in any manner. For example, in accordance with some embodiments of the present disclosure, the passive brushes may be formed by one or more 3D printers or automated fabricators, according to one or more 3D printing techniques, including but not limited to fused deposition modeling (or "FDM"), stereolithography (or "SLA"), digital light processing (or "DLP"), selective laser sintering (or "SLS"), material jetting, drop-on-demand (or "DOD"), sand binder jetting, metal binder jetting, direct metal laser sintering (or "DMLS"), selective laser melting (or "SLM"), electron beam melting (or "EBM"), or others. In most such techniques, an object is formed from powders, binding agents, liquid or other materials, which are deposited in specific locations, as necessary, before being allowed to cure or solidify. Alternatively, the passive brushes may be formed by nanolithography, injection molding, blow molding, rotational plastic molding, extrusion molding or thermoforming, or any other technique. Moreover, the passive brushes may be formed from any materials, such as rubbers or plastics. Such rubbers may include, but are not limited to, one or more butyl rubbers, chloroprene rubbers, ethylene propylene diene monomer rubbers, epichlorohydrin rubbers, fluoroelastomer rubbers, fluorosilicone rubbers, hydrogenated nitrile rubbers, natural rubbers, nitrile rubbers, perfluoroelastomer rubbers, polyacrylic rubbers, polyurethane rubbers, silicone rubbers, styrene butadiene rubbers, vulcanized rubbers, or others. Such plastics may include, but are not limited to, thermoplastics or thermosetting plastics such as epoxy or phenolic resins, polyurethanes or polyesters, as well as bioplastics, polyethylenes, polypropylenes or polyvinyl chlorides, or acrylonitrile butadiene styrenes.

At box 320, the passive brush is subjected to excitation over a range of frequencies, e.g., by an excitation source. For example, the excitation source may be an acoustic speaker or other system configured to project acoustic energy at constant or varying intensities over a range of frequencies. In some embodiments, a frequency of the acoustic energy may be linearly increased over time over a defined range of frequencies, such as from zero hertz to five hundred hertz (0 to 500 Hz), from zero hertz to two thousand hertz (0 to 2,000 Hz), or over any other ranges of frequencies, according to a step function or a delta function, or in any other manner. In some other embodiments, however, the excitation source may be any other component configured to excite the passive brush, such as by direct contact with the passive brush, e.g., a vibration source in contact with one or more surfaces of the passive brush, or an object that strikes the passive brush in one or more locations. For example, in some embodiments, the excitation source may be a machine such as a motor or other system that may be selectively programmed to generate vibrations or other motion over the range of frequencies. The excitation may be directed to the passive brush in general, or in any other manner.

At box 330, natural frequencies of vibration of the passive brush are identified based on the excitation of the passive brush over the range of frequencies at box 320. For example, in some embodiments, imaging data may be captured of the passive brush during the excitation over the range of frequencies, and frequencies at which elevated or maximum vibrations are observed may be determined from the imaging data. Power levels or energy levels of vibration may be determined by processing the imaging data, e.g., according to one or more optical flow methods or techniques, steerable filter methods, or by any other method or technique for estimating a power level or an energy level of vibrations at a given frequency. Any manner for determining corresponding power levels or energy levels of vibrations of passive brushes may be utilized in accordance with the present disclosure. The natural frequencies of the passive brush may be identified for the one or more modes of vibration as corresponding to peak levels of power or energy in response to the excitation. In some embodiments, the natural frequencies may be represented as a power spectral density depicting power levels associated with vibration of the passive brush over a range of frequencies, as a function of frequency. The natural frequencies and/or the power spectral density may be stored in one or more data stores. Moreover, mode shapes of the passive brush at the various natural frequencies may also be determined.

At box 340, the passive brush is placed in proximity to one or more fouled portions of a component. For example, the passive brush may be inserted into one or more openings or cavities of the component, such as the pitot tube 140 of FIGS. 1A through 1F. Alternatively, the passive brush may be placed atop or alongside one or more surfaces of the component. In some embodiments, any number of the passive brushes may be placed in proximity to the component, e.g., into an opening or a cavity of the component, or atop or alongside one or more surfaces of the component. Moreover, in some embodiments, the passive brush that is placed in proximity to the one or more fouled portions of the component may be the same passive brush that was subjected to the excitation over the range of frequencies at box 320, and for which the natural frequencies of vibration were identified at box 330, or a substantially identical passive brush. For example, the passive brush that is placed in proximity to the one or more fouled portions of the component may have the same sizes, shapes or dimensions (e.g., a stem having a common length and thickness, and a number of fans each having a common diameter and thickness) as the passive brush that was subjected to the excitation over the range of frequencies at box 320, and for which the natural frequencies of vibration were identified at box 330, e.g., such that the passive brushes are members of a common class or model.

Furthermore, the portions of the component to which the passive brush is placed in proximity need not have any fouling to any appreciable or noticeable extent. For example, the passive brush may be placed in proximity to one or more surfaces of a component as a part of a periodic or regularly scheduled maintenance program or procedure, or for any reason, without regard to an extent to which such surfaces are fouled, or without determining whether such surfaces are actually fouled.

At box 350, the component and the passive brush are subjected to excitation at one or more of the natural frequencies of the passive brush identified at box 330. For example, the component and the passive brush may be subjected to excitation at any of the natural frequencies in series, in a stepwise fashion, or in a linear manner, e.g., across a range of frequencies. The natural frequencies by which the component and the passive brush are excited may be selected in any manner and on any basis, such as a mode shape or other response by the passive brush to the external excitation at a given natural frequency, or on any other basis. Furthermore, in some embodiments, the excitation may be applied to the component and the passive brush continuously, e.g., in a constant manner. Alternatively, in some embodiments, the excitation may be applied in a pulse-modulated manner, such that the acoustic excitation is supplied at the natural frequencies for brief periods of time, e.g., according to a modulated frequency, in order to further enhance the responses of the passive brush to the excitation.

At box 360, the passive brush is removed from the proximity to the component, and the process ends. For example, the passive brush may be manually withdrawn from the proximity to the component, e.g., by manual contact with the passive brush, by inverting the component with respect to the passive brush, or by any other form of manual agitation. Alternatively, in some embodiments, the passive brush may be removed by suction, e.g., by a source of negative gage pressure such as a vacuum suction or return, which may also remove any dirt, dust or other debris released from the component by vibration of the passive brush. In still other embodiments, where the passive brush is connected to a tension connector or any other member, the passive brush may be withdrawn from the component by the tension connector or other member. In still further embodiments, the passive brush may be removed from the proximity to the component by subjecting the passive brush to excitation at a selected frequency, e.g., a selected natural frequency of vibration, that is known to preferentially induce or initiate travel by way of vibration, or by subjecting the passive brushes to an electrostatic, attractive charge. The passive brushes may be removed from the proximity to the component in any manner in accordance with embodiments of the present disclosure.

As is discussed above, a passive brush may be formed from any suitable materials and in any manner, such as by one or more 3D printing techniques, e.g., using one or more 3D printers or automated fabricators, by nanolithography, or by any other techniques, and natural frequencies of the passive brush may be determined by subjecting the passive brush to excitation over a range of frequencies. Referring to FIGS. 4A through 4E, views of aspects of one system in accordance with embodiments of the present disclosure are shown. Except where otherwise noted, reference numerals preceded by the number "4" shown in FIGS. 4A through 4E indicate components or features that are similar to components or features having reference numerals preceded by the number "2" shown in FIG. 2 or by the number "1" shown in FIGS. 1A through 1F.

Figure 4A:
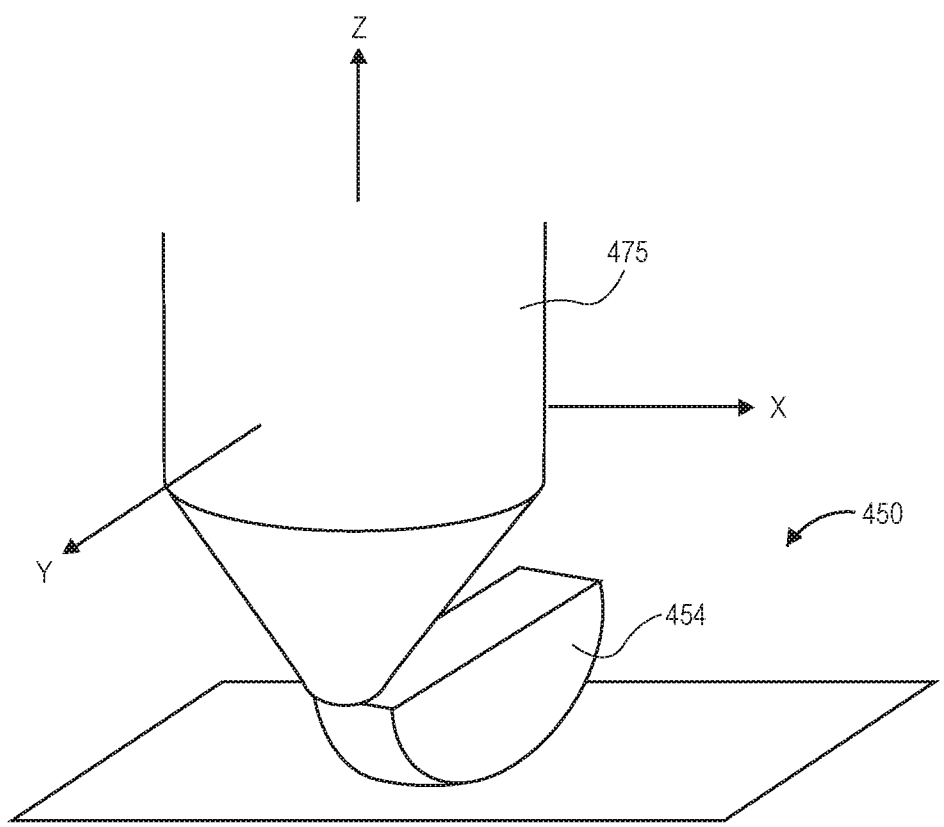

As is shown in FIG. 4A, a portion of a passive brush 450 (viz., a fin 454) is formed by an automated fabricator 475 (e.g., a 3D printer), which may include any number or type of tooling equipment, including any number of machines or components for manipulating raw materials, and may be programmed with one or more sets of instructions to form an end product from the raw materials. For example, in some embodiments, the automated fabricator 475 may include one or more filaments, heads, blades, nozzles, motors, rollers, heat sources, radiation sources or other elements for molding, shaping, forming, curing, solidifying or depositing layers of one or more of the raw materials, or otherwise manipulating the raw materials, and traveling in any direction in three-dimensional space while depositing the layers in order to form an end product therefrom. Such raw materials may include any liquid, gaseous or solid materials, or gels, resins, plasmas or any other types or classes of materials, that may be accessible to the automated fabricator 475 and molded, shaped, formed, cured, solidified or deposited into an end product.

For example, the raw materials may include, but are not limited to, thermoplastic materials such as acrylonitrile-butadiene-styrene, nylon, high density polyethylene, polycarbonate, polyetherimide, polyether ether ketone, polylactic acid, poly(meth)acrylate, polyphenylene sulphone, polystyrene, as well as one or more polymers, copolymers or ionomers thereof, or combinations of any of such materials. The number or types of raw materials that may be combined by the automated fabricator 475 to form the passive brush 450 are not limited. Additionally, such raw materials may be maintained or stored in one or more vats, vessels, tanks, bins, platforms or other storage spaces that are within a common chamber with the automated fabricator 475, or accessible thereto. Alternatively, those of ordinary skill in the pertinent arts will recognize that the passive brush 450 may be formed in any manner.

Perspective, end and side views of the passive brush 450 are shown in FIG. 4B. As is shown in FIG. 4B, the passive brush 450 includes a stem (or pipe) 452 and a plurality of fins 454. The stem 452 is a substantially cylindrical section aligned along a longitudinal axis. Each of the plurality of fins 454 is a substantially disc-like member that is mounted to the stem 452, and approximately defines a plane that is perpendicular to the longitudinal axis of the stem 452.

Figure 4C:
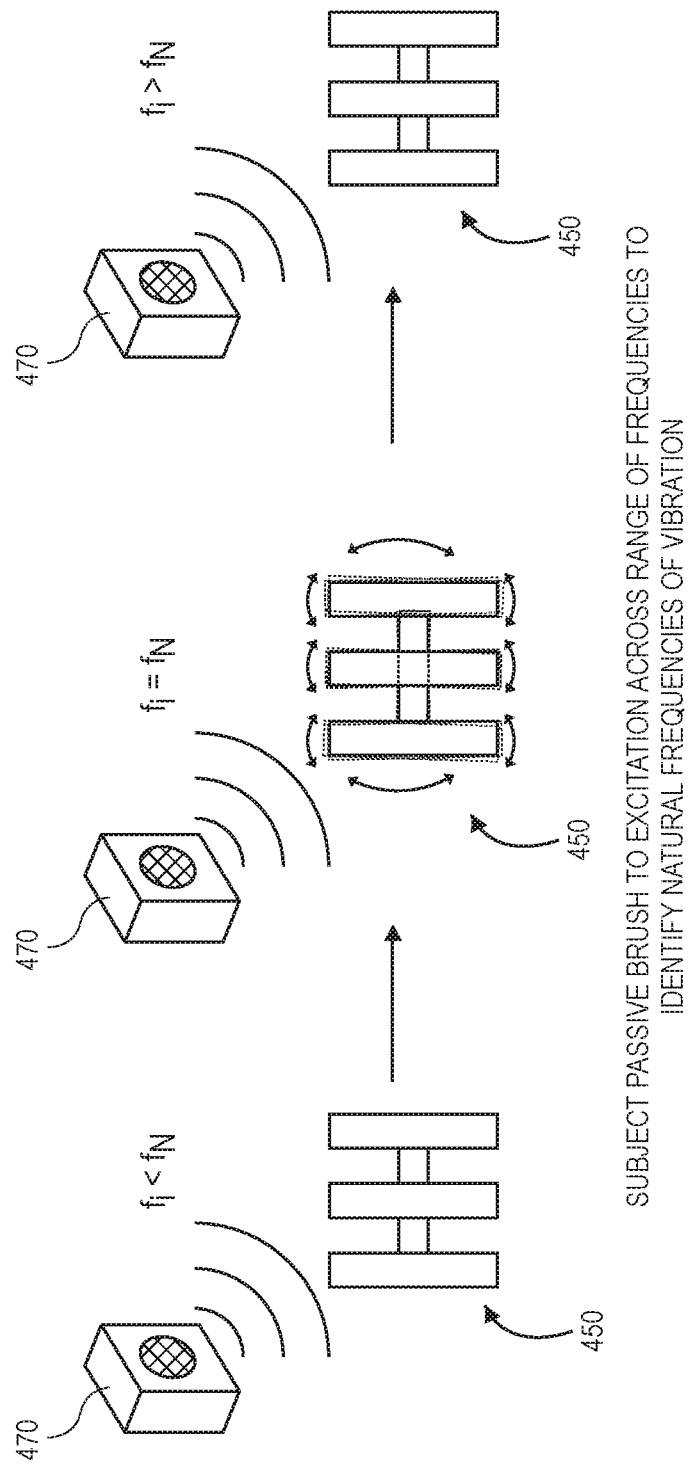

As is shown in FIG. 4C, one or more natural frequencies of vibration of the passive brush 450 may be identified by subjecting the passive brush 450 to excitation over a range of frequencies. For example, as is shown in FIG. 4C, an acoustic speaker (or other excitation source) may project acoustic energy in the form of sounds at one or more frequencies $f_i$ of a range, at any level of intensity, upon the passive brush 450. Alternatively, the acoustic speaker 470 may be replaced or supplemented with any other type or form of excitation source that may excite the passive brush 450 at known, selected frequencies.

A natural frequency $f_N$ of vibration of the passive brush 450 may be identified based on the physical responses of the passive brush 450 to the excitation. For example, as is shown in FIG. 4C, where the passive brush 450 is excited at frequencies $f_i$ that are less than the natural frequency $f_N$, or at frequencies $f_i$ that are greater than the natural frequency $f_N$, the power or energy levels of vibration of the passive brush 450 are limited or non-existent. Where the passive brush 450 is excited at a frequency $f_i$ that is substantially equal to the natural frequency $f_N$, however, the power levels or energy levels of vibration, e.g., the behavioral qualities of the passive brush 450 in the presence of the excitation indicate that the frequency $f_i$ is a natural frequency $f_N$.

For example, as is shown in FIG. 4D, excitation of the passive brush 450 at the natural frequency $f_N$ causes the fins 454 of the passive brush 450 to vibrate in alternating fashion with respect to the longitudinal axis of the stem 452. Additionally, as is also shown in FIG. 4D, the stem 452 may further vibrate in directions perpendicular to the longitudinal axis of the stem 452 in response to the excitation of the passive brush 450 at the natural frequency $f_N$. Any number of natural frequencies may be identified for the passive brush 450 in accordance with embodiments of the present disclosure.

Figure 4E:
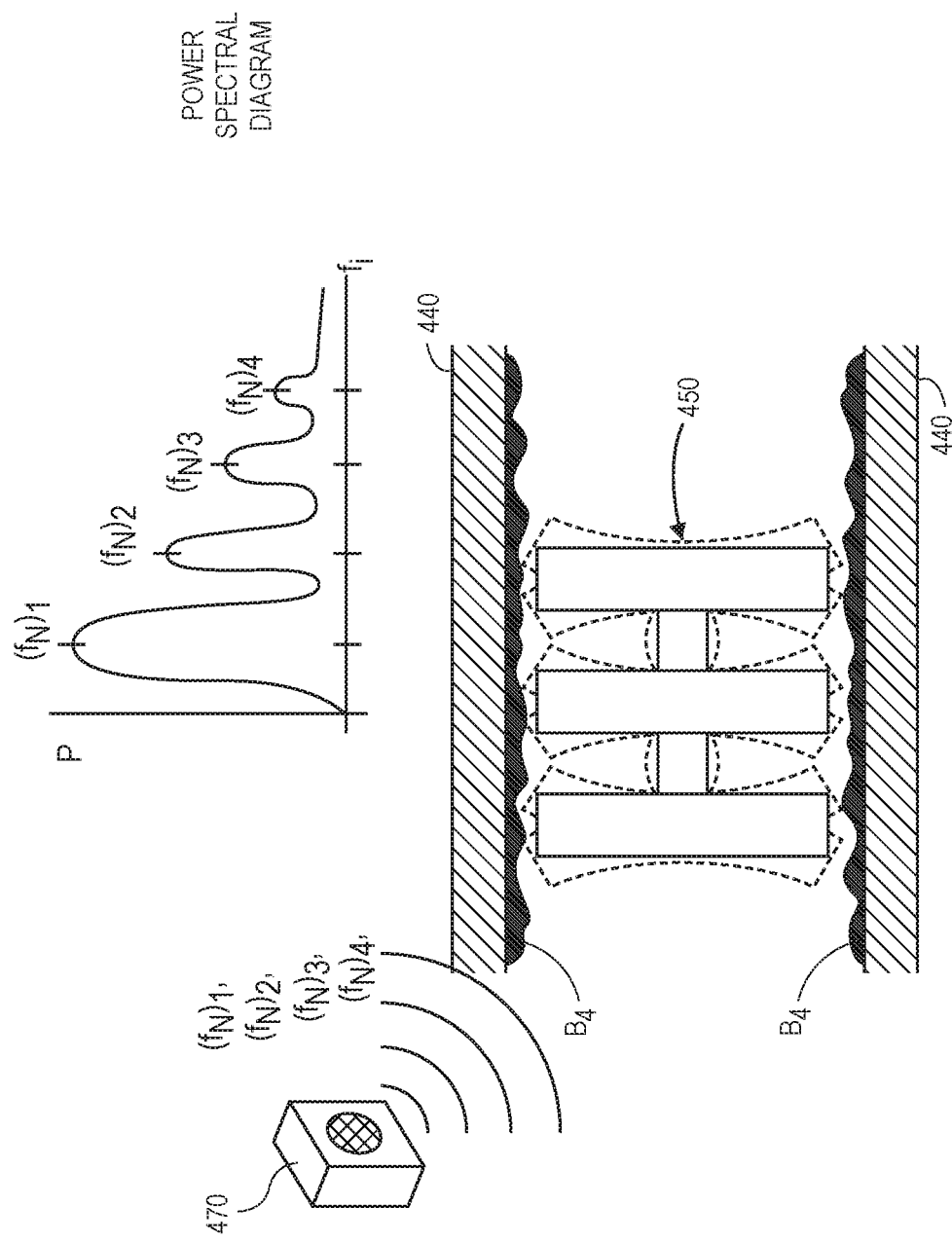

As is shown in FIG. 4E, the passive brush 450 may be placed in contact with one or more surfaces of a component 440 that are fouled with dirt, dust or other debris $B_4$. When the component 440 and the passive brush 450 are subjected to excitation at one or more natural frequencies $(f_N)_1$, $(f_N)_2$, $(f_N)_3$, $(f_N)_4$ of the passive brush 450, the physical response of the passive brush 450 to excitation at natural frequencies, such as is shown in FIG. 4D, causes the passive brush 450 to release the debris $B_4$ from the surfaces of the component 440. The physical response of the passive brush 450 to the excitation at the natural frequencies may further cause the passive brush 450 to translate along the surfaces of the component 440 in either direction. In some embodiments, a mode shape of the passive brush 450, or a spatial distribution or model of the behavior of the passive brush 450 or portions thereof in the presence of vibration at the natural frequencies $(f_N)_1$, $(f_N)_2$, $(f_N)_3$, $(f_N)_4$, may be determined in any manner. Furthermore, in some embodiments, because the passive brush 450 may physically respond to excitation at different ones of the natural frequencies $(f_N)_1$, $(f_N)_2$, $(f_N)_3$, $(f_N)_4$ in different ways, one or more of the natural frequencies $(f_N)_1$, $(f_N)_2$, $(f_N)_3$, $(f_N)_4$, or durations of excitation at such frequencies, may be selected based on the respectively observed physical responses.

Figure 5A:
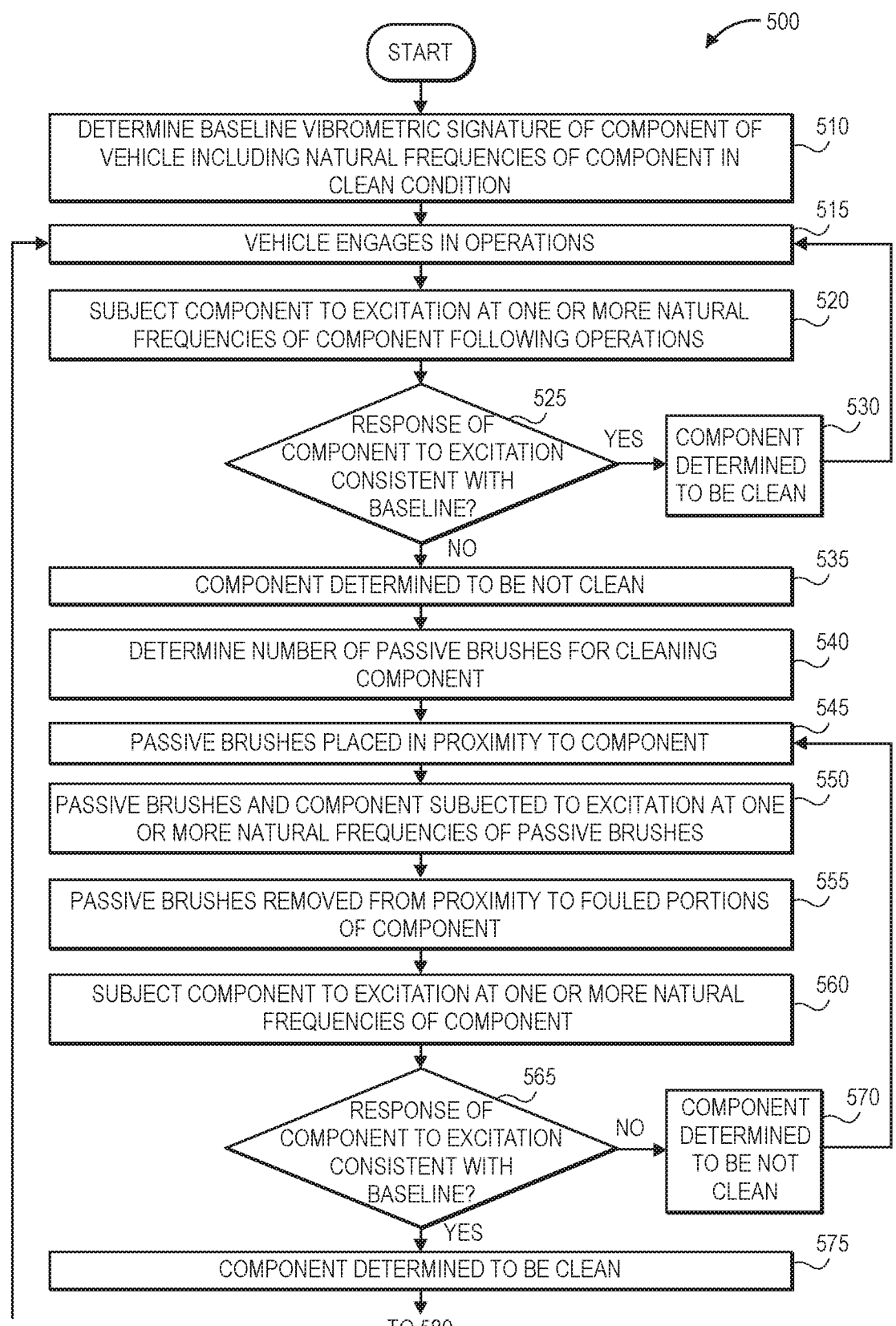
FIGS. 5A and 5B are a flow chart of one process in accordance with embodiments of the present disclosure.
Figure 5B:
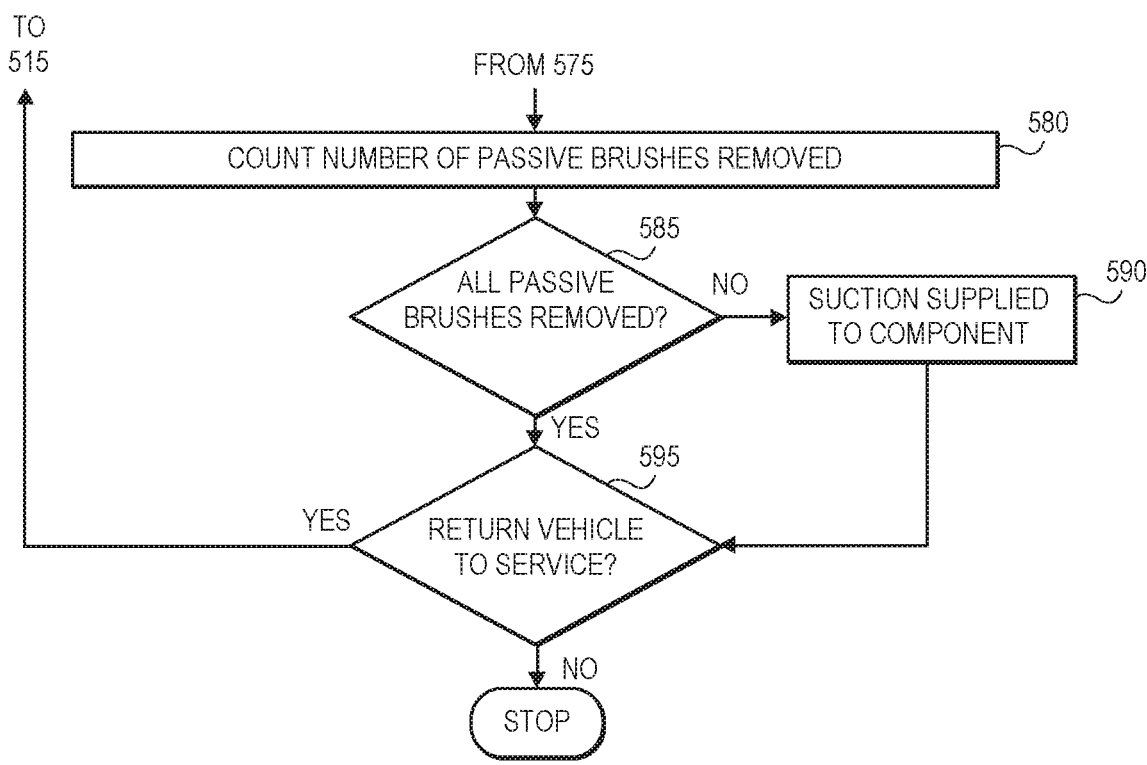

Referring to FIGS. 5A and 5B, a flow chart 500 of one process in accordance with embodiments of the present disclosure is shown. At box 510, a baseline vibrometric signature of a component of a vehicle that includes one or more natural frequencies of the component in a clean condition is determined. For example, in some embodiments, the component may be subjected to excitation over a range of frequencies by an acoustic speaker or other system configured to project acoustic energy at constant or varying intensities. In some embodiments, a frequency of the acoustic energy may be linearly increased over time over a defined range of frequencies, such as from zero hertz to five hundred hertz (0 to 500 Hz), from zero hertz to two thousand hertz (0 to 2,000 Hz), or over any other ranges of frequencies, according to a step function or a delta function, or in any other manner. In some other embodiments, however, the excitation source may be any other system configured to excite the vehicle or the component thereof, such as by direct contact with the vehicle or the component, e.g., a vibration source adhered or affixed to one or more surfaces of the vehicle or the component, or an object that strikes the vehicle or the component in one or more locations. For example, in some embodiments, the excitation source may be a machine such as a motor or other system that may be selectively programmed to generate vibrations or other motion over the range of frequencies. The excitation may be directed to the vehicle in general, or to the component in particular.

In parallel with the excitation, imaging data may be captured by one or more imaging devices having at least the component of the vehicle within a field of view, to determine corresponding power levels of vibrations of at least the component, as induced by the excitation. In some embodiments, positions or intensities of one or more selected pixels corresponding to the component of the vehicle may be detected and tracked in successive frames to determine the extent to which the component vibrates in response to the excitation. In some embodiments, the selected pixels may correspond to uniquely visible textures, patterns, surfaces or markings on the component, or may be identified as a function of a level of lighting within the field of view of the digital camera, a measure of surface reflectance in one or more locations on surfaces of the component, or based on any other factor. In some embodiments, a single pixel corresponding to the component may be selected. In some other embodiments, multiple pixels corresponding to the component may be selected, and such pixels may include a cluster of pixels in or around a single location on surfaces of the component, or in different locations on surfaces of the component.

In some embodiments, an optical flow method or technique may be utilized to detect and track small movements of aspects of the vehicle within the imaging data. In some embodiments, a steerable filter method by which small motions across or between image frames are estimated using a bank of filters, or a steerable pyramid, to break down each of the image frames into an amplitude and a phase at different scales and orientations. Pairs of such filters may be used to estimate a velocity in directions orthogonal to the orientations of the respective filter pairs, and phases of the velocities are used to estimate extents of local vibrations or small motions. Where such phases are subtracted from phases computed for a reference frame, differentials of such phases may be summed and weighted by squares of their amplitudes in order to estimate a power level (e.g., measured in decibels) of the local vibration, and to determine a two-dimensional distribution of vibrations across the visible aspects of the vehicle for a given frequency of excitation. Any other method or technique for estimating a power level of vibrations at a given frequency may be utilized in accordance with the present disclosure.

Alternatively, intensities of the selected pixels in the imaging data, e.g., values within a range of 0 (or black) to 255 (or white) for an eight-bit grayscale image, or values of one or more channels, such as a red channel, a green channel or a blue channel of a color (or "RGB") image, may be determined for each of a plurality of video images captured as the vehicle is subjected to the excitation over the range of frequencies, such that intensities are determined in real time or in near-real time, or at a later time, e.g., after the vehicle has been subjected to the excitation. A time series may be generated based on the differences in intensities of the selected pixels in successive video images, and may represent the intensities separated by a difference in time between the capture of the images, e.g., a reciprocal of the frame rate. For example, in some embodiments, where imaging data is captured by a high-speed digital camera having a frame rate of approximately four thousand frames per second (or 4,000 fps), intensities may be separated in a time series by approximately one quarter millisecond (or 0.25 ms). A time series may take any form, including but not limited to an array having any dimensions, including but not limited to a dimension corresponding to a number of selected pixels and a dimension corresponding to a number of video images.

Any manner for determining corresponding power levels of vibrations of the component of the vehicle, as induced by the excitation, may be utilized in accordance with the present disclosure. Subsequently, a set of natural frequencies at which the first aspect of the vehicle is visibly vibrating are determined based on the imaging data. For example, the set of natural frequencies may be identified for the one or more modes of vibration as corresponding to peak levels of power or energy of the component in response to the excitation. The baseline vibrometric signature may be generated for at least the component of the vehicle based on the set of natural frequencies. For example, the baseline vibrometric signature may be a set of data identifying the set of natural frequencies at which peak power levels were observed, or a plot or wave corresponding to power levels associated with frequencies over the range. In some embodiments, the baseline vibrometric signature may be represented as a power spectral density diagram depicting power levels associated with vibration of the component over a range of frequencies, as a function of frequency. A time series may be transformed in any manner to determine the power spectral density, or to form the power spectral density diagram, such as by applying a fast Fourier transform to the time series. The baseline vibrometric signature may be stored in one or more data stores, and used for any purpose.

Alternatively, the baseline vibrometric signature of the component may be determined in any other manner.

At box 515, the vehicle engages in operations, such as one or more missions requiring travel from one location to another location, e.g., to deliver payloads from warehouses or other like facilities to customers, or any other operations that cause the vehicle to travel at one or more selected courses, speeds or altitudes, powered by one or more propulsion motors or like systems.

At box 520, the component is again subjected to excitation over a range of frequencies including one or more natural frequencies of the component following the operations. For example, in some embodiments, the same system or apparatus, or a similar or identical system or apparatus, e.g., a system or apparatus of a common class, that was used to determine the baseline vibrometric signature of the component at box 510 may also be used to subject the component to excitation at box 520. At box 525, whether the response of the component to the excitation is consistent with the baseline vibrometric signature is determined. For example, where the component is observed to have peak levels of power or energy at one or more discrete frequencies, e.g., another set of natural frequencies, such discrete frequencies may be compared to the baseline vibrometric signature to determine whether such discrete frequencies are consistent with the response of the component to excitation when the component was known to be in a clean or otherwise compliant condition.

If the response of the component to the excitation is consistent with the baseline vibrometric signature, then the process advances to box 530, where the component is determined to be clean, before returning to box 515, where the vehicle is cleared to perform further operations. For example, where the response of the vehicle is consistent with the baseline vibrometric signature, the vehicle may be understood to be clean, or sufficiently unfouled by dirt, dust or other debris.

If the response of the component to the excitation is not consistent with the baseline, however, then the process advances to box 535, where the component is determined to be unclean or otherwise not compliant. For example, a difference between the response of the component and the baseline vibrometric signature may indicate the presence of dirt, dust or debris on one or more surfaces of the component, which may or may not be visible to or detectable by the human eye or one or more imaging systems, e.g., digital cameras.

At box 540, a number of passive brushes for cleaning the component of the vehicle is identified. For example, a single passive brush that may be accommodated within one or more openings or cavities of the component, or any number of the passive brushes that may be accommodated within the openings or cavities of the component, may be determined or selected. At box 545, the passive brushes are placed in proximity to the component, e.g., within an opening or cavity that is believed to be fouled with dirt, dust or other debris, or adjacent to one or more surfaces of the component that are believed to be so fouled.

At box 550, the passive brushes and the component are subjected to excitation at one or more natural frequencies of the passive brushes, which may have been determined in any manner. The passive brushes and the component may have been subjected to the excitation in any manner. For example, in some embodiments, the passive brushes and the component may be subjected to the excitation by acoustic energy in the form of sounds at the natural frequencies and at any intensity, e.g., by the same system or apparatus, or a similar or identical system or apparatus, that was used to determine the baseline vibrometric signature of the component at box 510, or to subject the component to excitation at box 520. Alternatively, any excitation source that is aligned and configured to excite the component at the natural frequencies, e.g., by direct contact with the component or in any other manner, may be utilized. For example, in some embodiments, where the component is an integral part of the vehicle (e.g., an aerial vehicle), one or more motors of the vehicle may act as an intrinsic excitation source for the vehicle, and such motors may be specifically controlled to impart excitation upon the component at one or more of the natural frequencies.

At box 555, passive brushes are removed from the proximity to the fouled portions of the component. For example, passive brushes may be manually withdrawn from an opening or cavity of the component, or the component may be inverted to empty or dump the passive brushes therefrom. Alternatively, suction or an electrostatic, attractive charge may be applied to or near the fouled portions of the component. The passive brushes may be removed from the proximity to the fouled portions of the component in any manner in accordance with embodiments of the present disclosure.

At box 560, the component is subjected to excitation at one or more natural frequencies of the component, e.g., the frequencies identified in the baseline vibrometric signature determined at box 510. The component may be subject to excitation at the one or more natural frequencies in any manner, e.g., by an acoustic speaker configured to project acoustic energy at such frequencies and at constant or varying intensities, by a system or component in direct contact with the vehicle or the component, e.g., a vibration source adhered or affixed to one or more surfaces of the vehicle or the component, or in any other manner. In some embodiments, the same system or apparatus, or a similar or identical system or apparatus, e.g., a system or apparatus of a common class, that was used to determine the baseline vibrometric signature of the component at box 510 or that was used to subject the component to excitation at box 520 may also be used to subject the component to excitation at box 560.

At box 565, whether the response of the component to the excitation at the one or more natural frequencies was consistent with the baseline is determined. Such a determination may be made in the same manner as in box 525, or in any other manner.

If the response of the component to the excitation is not consistent with the baseline, however, then the process advances to box 570, where the component is determined to be unclean or otherwise not compliant, before returning to box 545, where passive brushes are placed in proximity to the component, and to box 550, where the passive brushes and the component are subjected to excitation at one or more natural frequencies of the passive brushes. Alternatively, the process may return to box 545, where the component may be simply subjected to the excitation at the natural frequencies of the passive brushes.

If the response of the component to the excitation is consistent with the baseline vibrometric signature, however, then the process advances to box 575, where the component is determined to be clean, or sufficiently unfouled by dirt, dust or other debris. At box 580, a number of the passive brushes removed at box 555 is determined. For example, the passive brushes may be weighed prior to placing the passive brushes in proximity to the component at box 545, and the passive brushes removed at box 555 may also be weighed. To the extent that the weights of the passive brushes are substantially equal, most or all of the passive brushes that were placed in proximity to the component may be presumed to have been removed therefrom. To the extent that the weights are different, however, a number of the passive brushes that was removed, or was not removed, may be determined based on a difference in the weights, particularly where the passive brushes have a substantially constant unit mass. Alternatively, the passive brushes may be manually counted, or otherwise counted in any other manner.

At box 585, whether all of the passive brushes that were placed in proximity to the component at box 545 were removed at box 575 is determined. If all of the passive brushes were not removed, the process advances to box 590, where suction is applied to the component in order to remove any remaining passive brushes therefrom. In such embodiments, the suction may further remove any dirt, dust or other debris that was freed from surfaces of the component during the excitation. If all of the passive brushes were removed, or after the suction was applied, the process advances to box 595, where whether the vehicle is to be returned to service is determined. If the vehicle is to be returned to service, the process returns to box 515, where the vehicle engages in operations, such as one or more missions requiring travel from one location to another location. If the services of the vehicle are no longer required, however, then the process ends.

As is discussed above, any number of passive brushes may be inserted into openings or cavities, or otherwise placed into contact (e.g., alongside or adjacent to) with one or more surfaces that may be fouled with dirt, dust or other debris, and subjected to excitation at one or more natural frequencies. Referring to FIGS. 6A through 6F, views of aspects of one system in accordance with embodiments of the present disclosure are shown. Except where otherwise noted, reference numerals preceded by the number "6" shown in FIGS. 6A through 6F indicate components or features that are similar to components or features having reference numerals preceded by the number "4" shown in FIGS. 4A through 4E, by the number "2" shown in FIG. 2 or by the number "1" shown in FIGS. 1A through 1F.

Figure 6A:
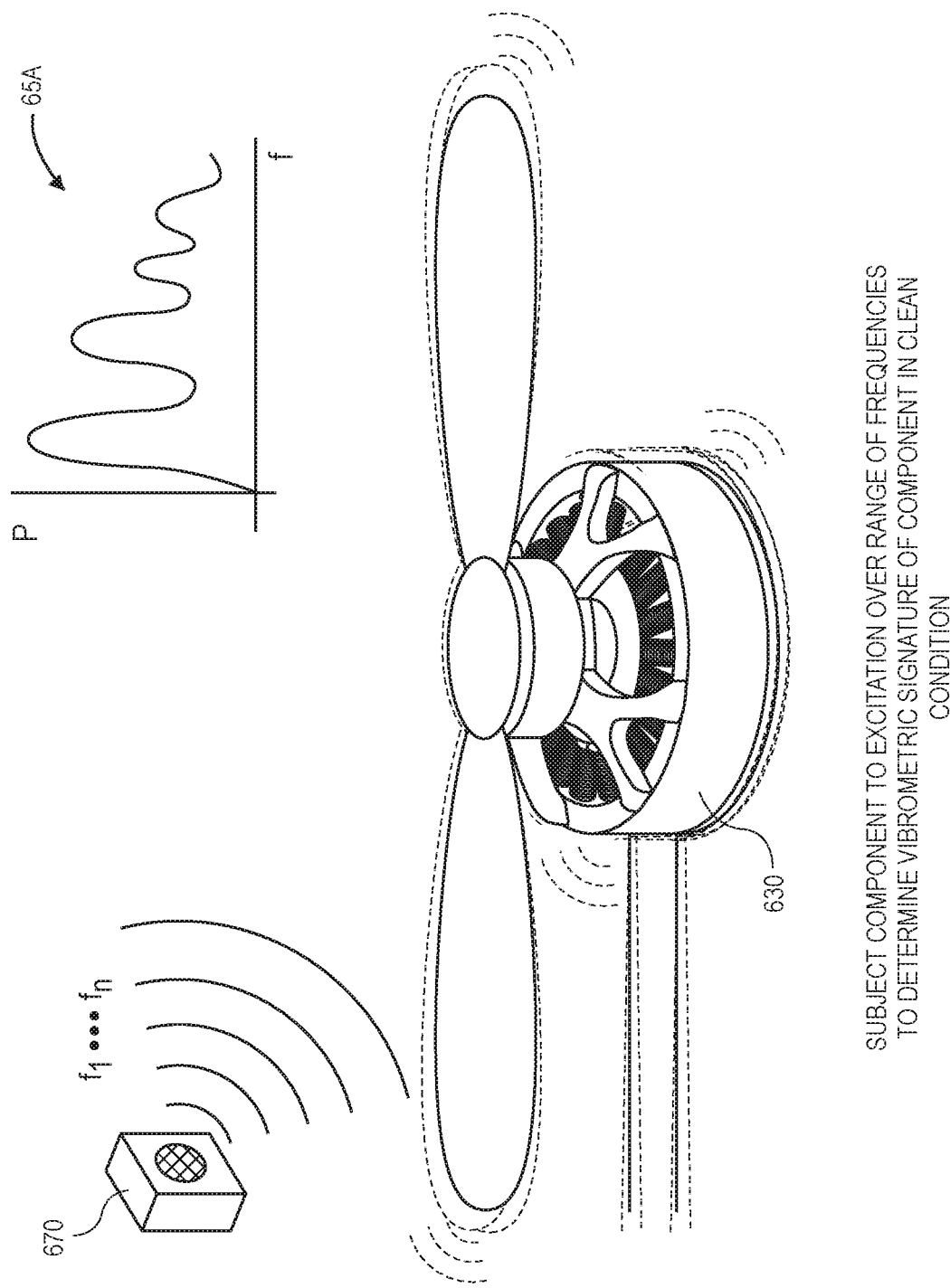

As is shown in FIG. 6A, a motor 630 or another component of an aerial vehicle or other system that has been determined to be in a clean condition is subjected to excitation over a range of frequencies $f_1 \ldots f_n$ by an excitation source 670 (e.g., an acoustic speaker). The acoustic energy may be projected at constant or varying intensities and over a defined range of frequencies, e.g., linearly, according to a step function, a delta function, or in any other manner. During the excitation, power levels or energy levels of vibration may be determined in any manner, such as by capturing imaging data of the motor 630 and by processing the imaging data, e.g., according to one or more optical flow methods or techniques, steerable filter methods, or by any other method or technique for estimating power levels or energy levels of vibrations at a given frequency. Any manner for determining corresponding power levels or energy levels of vibrations of the motor 630 may be utilized in accordance with the present disclosure. Natural frequencies of the motor 630 may be identified for the one or more modes of vibration as corresponding to peak levels of power or energy in response to the excitation.

In response to the excitation, a vibrometric signature 65A represented as a power spectral density depicting power levels associated with vibration of the motor 630 over the range of frequencies $f_1 \ldots f_n$, as a function of frequency, may be determined. The vibrometric signature 65A, e.g., a baseline vibrometric signature, may be stored in association with the motor 630 or an aerial vehicle associated with the motor 630, e.g., in one or more data stores.

Figure 6B:
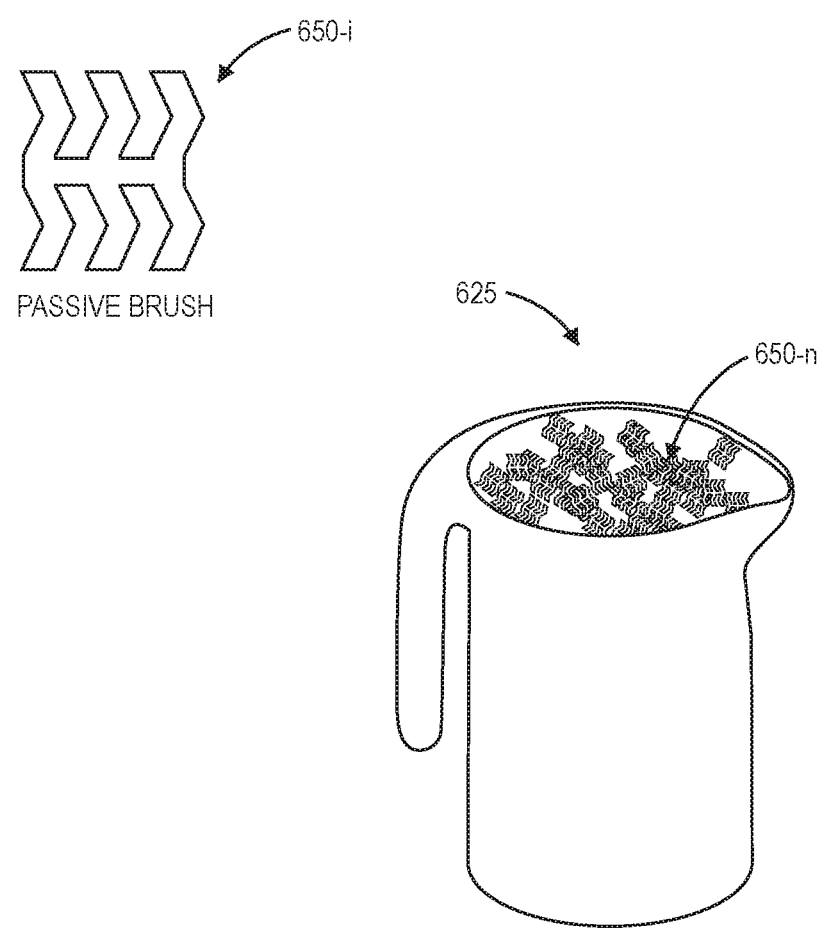
Figure 6C:
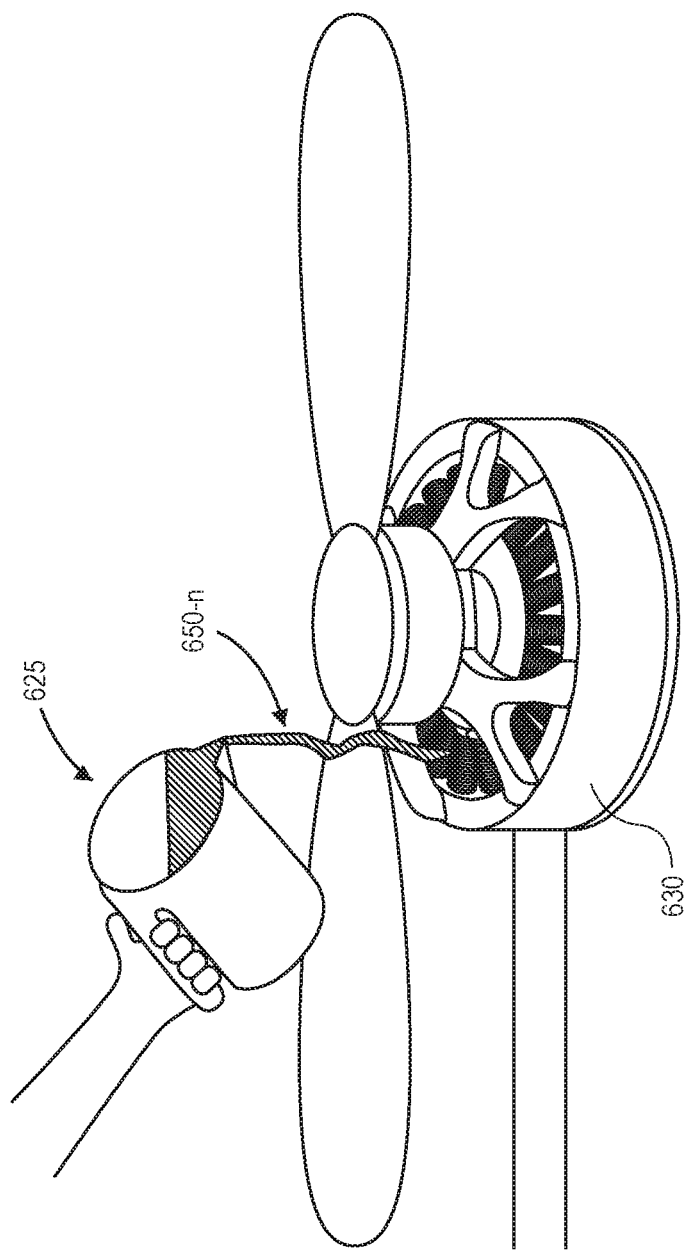

As is shown in FIG. 6B, a plurality of passive brushes 650-$n$ are within a dispenser 625 (e.g., a beaker or pitcher). A representative passive brush 650-$i$ of the passive brushes 650-$n$ includes a plurality of fins extending radially outward from a stem or pipe having a longitudinal axis. As is shown in FIG. 6C, the dispenser 625 is manipulated to deposit the passive brushes 650-$n$ into a housing or other structure associated with the motor 630, e.g., by pouring or any other action.

As is shown in FIG. 6D, with the passive brushes 650-$n$ deposited into the motor 630, the motor 630 and the passive brushes 650-$n$ may be subjected to excitation at natural frequencies of vibration $(f_N)_1$, $(f_N)_2$, $(f_N)_3$ of the passive brushes 650-$n$, and any others, thereby causing the passive brushes 650-$n$ to vibrate at peak energies in contact with (e.g., alongside or adjacent to) one or more internal surfaces of the motor 630. Thus, the passive brushes 650-$n$ may be used to clean or otherwise release any dirt, dust or other debris from the internal surfaces of the motor 630, without requiring any pressurized water, air or other fluids, or cleaning agents.

Figure 6E:
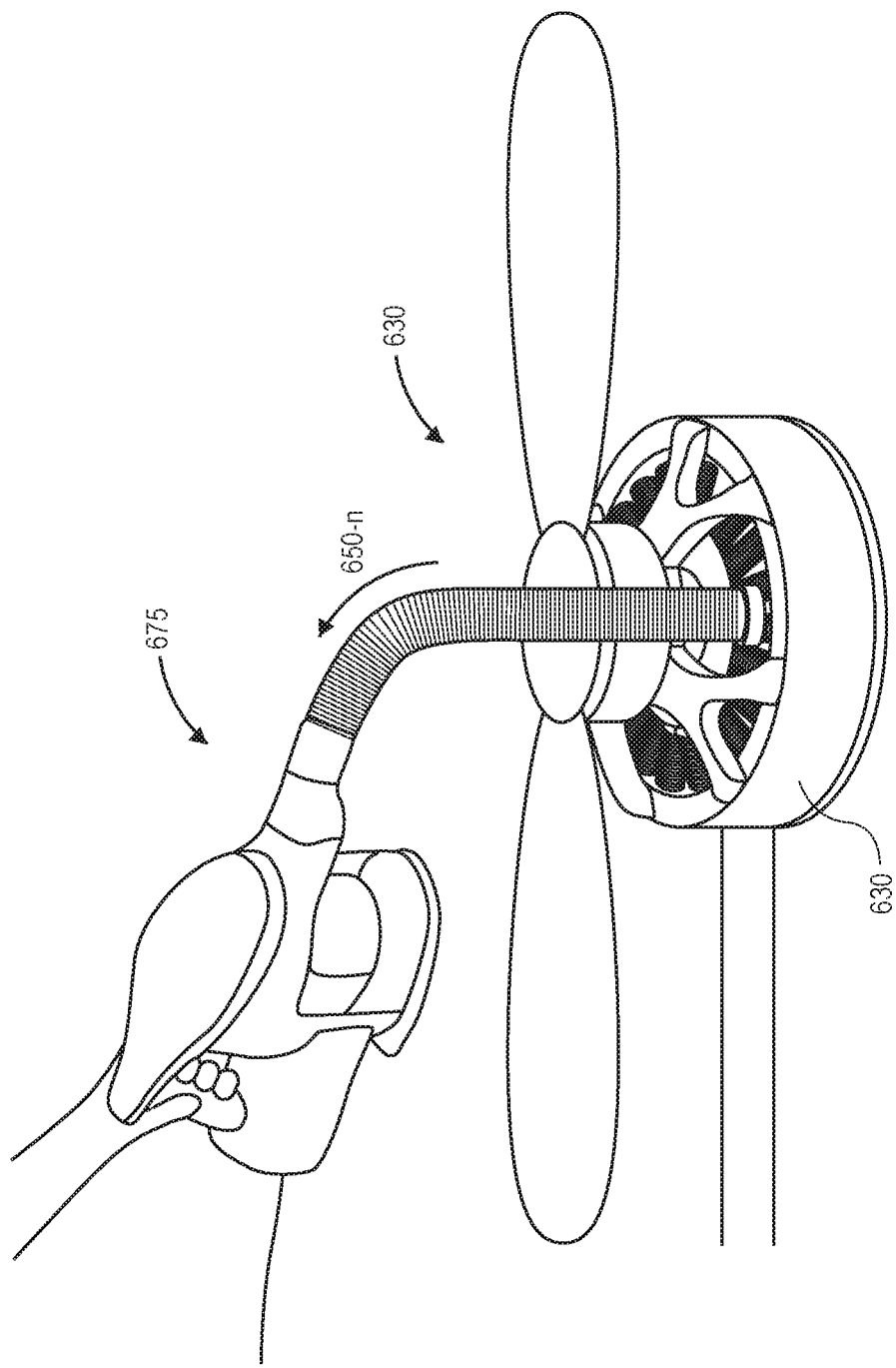

As is shown in FIG. 6E, the passive brushes 650-$n$ and any debris may be removed from the motor 630 in any manner, e.g., by applying suction using a vacuum 675 or other system. The suction applied by the vacuum 675 may be used to remove any or all of the passive brushes 650-$n$, and any or all of the debris removed thereby, e.g., via a nozzle or like system. Alternatively, the passive brushes and the debris may be removed from the motor 630 in any manner in accordance with embodiments of the present disclosure.

Figure 6F:
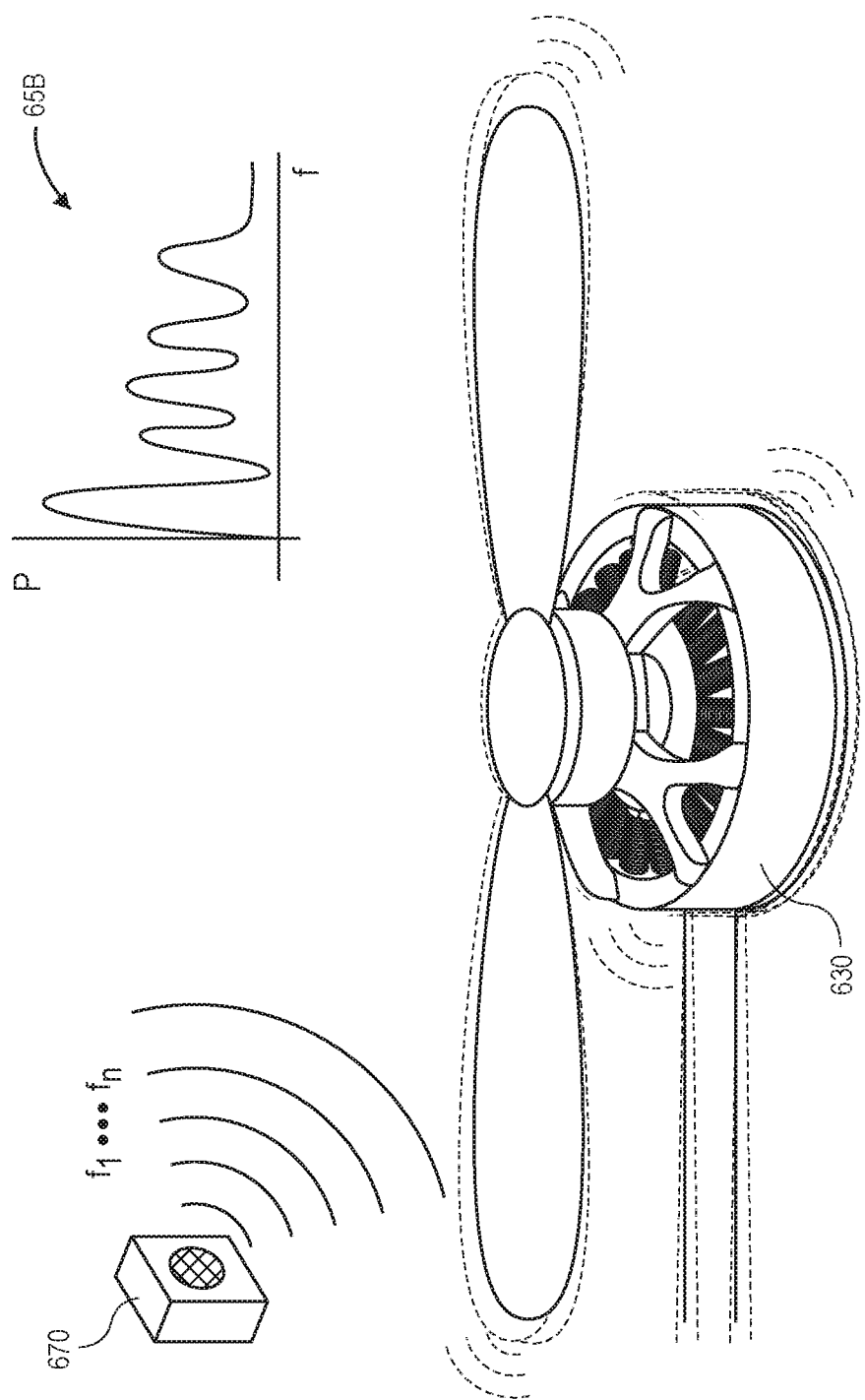

As is shown in FIG. 6F, after the suction has been removed from the motor 630, the motor 630 may again be subjected to excitation over the range of frequencies $f_1 \ldots f_n$ by the excitation source 670, or by any other excitation source. During the excitation, power levels or energy levels of vibration may be determined in any manner, and corresponding power levels or energy levels of vibrations of the motor 630 may also be determined or identified for the range of frequencies $f_1 \ldots f_n$. In response to the excitation, a vibrometric signature 65B represented as a power spectral density depicting power levels associated with vibration of the motor 630 over the range of frequencies $f_1 \ldots f_n$, as a function of frequency, may be determined. The vibrometric signature 65B may be compared to the vibrometric signature 65A. To the extent that the vibrometric signatures 65A, 65B are the same or substantially similar to one another, the motor 630 may be determined to be clean or otherwise compliant with one or more relevant standards. To the extent that the vibrometric signatures 65A, 65B are different from one another, however, the motor 630 may be determined to be unclean or otherwise not compliant with relevant standards. Further cleaning or, alternatively, suction by the vacuum 675, may be applied to the motor 630, as necessary.

The passive brushes of the present disclosure may have any size or shape. Referring to FIGS. 7A through 7D, views of aspects of one system in accordance with embodiments of the present disclosure are shown. Except where otherwise noted, reference numerals preceded by the number "7" shown in FIGS. 7A through 7D indicate components or features that are similar to components or features having reference numerals preceded by the number "6" shown in FIGS. 6A through 6F, by the number "4" shown in FIGS. 4A through 4E, by the number "2" shown in FIG. 2 or by the number "1" shown in FIGS. 1A through 1F.

Figure 7A:
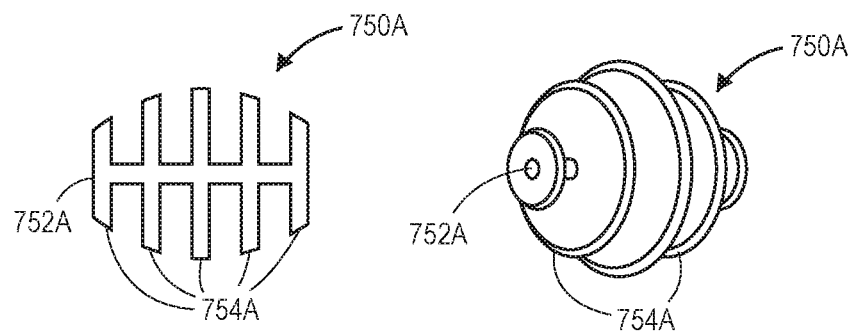
FIGS. 7A through 7D are views of some passive brushes in accordance with embodiments of the present disclosure.

As is shown in FIG. 7A, a passive brush 750A has a shape of a prolate spheroid. The passive brush 750A includes a stem 752A having a plurality of substantially disc-shaped fins 754A joined to the stem 752A that extend radially outward therefrom and are concentric and substantially planar, but with varying diameters. As is further shown in FIG. 7A, the fins 754A having larger diameters are located at or near a center of the stem 752A, while the fins 754A having smaller diameters are located at or near ends of the stem 752A. Thus, the passive brush 750A may be inserted into openings or cavities having dimensions not less than the largest diameters of the fins 754A, but may also be readily inserted into one or more openings or cavities, or placed into contact with one or more surfaces, in large numbers, before being subject to excitation at one or more natural frequencies.

Figure 7B:
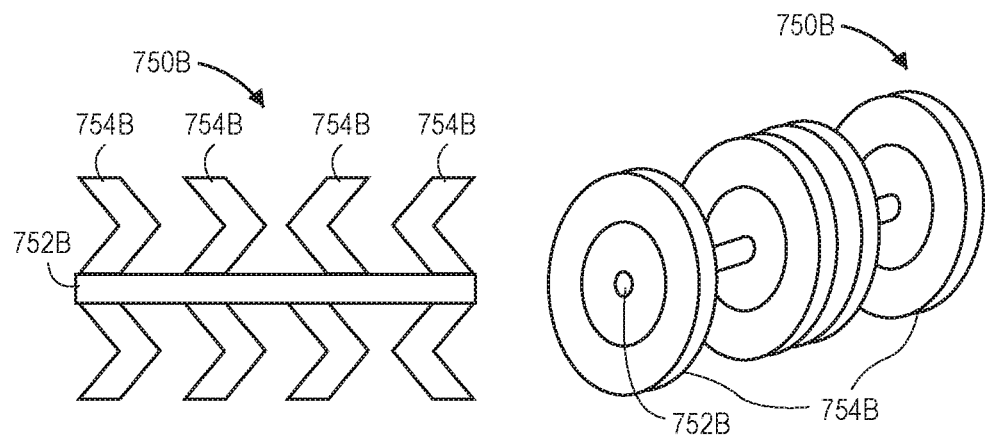

As is shown in FIG. 7B, a passive brush 750B has a substantially cylindrical shape, with a stem 752B and a plurality of angled or tapered fins 754B joined to the stem 752B and extending radially outward therefrom and are concentric but substantially non-planar, and feature substantially equal diameters.

Figure 7C:
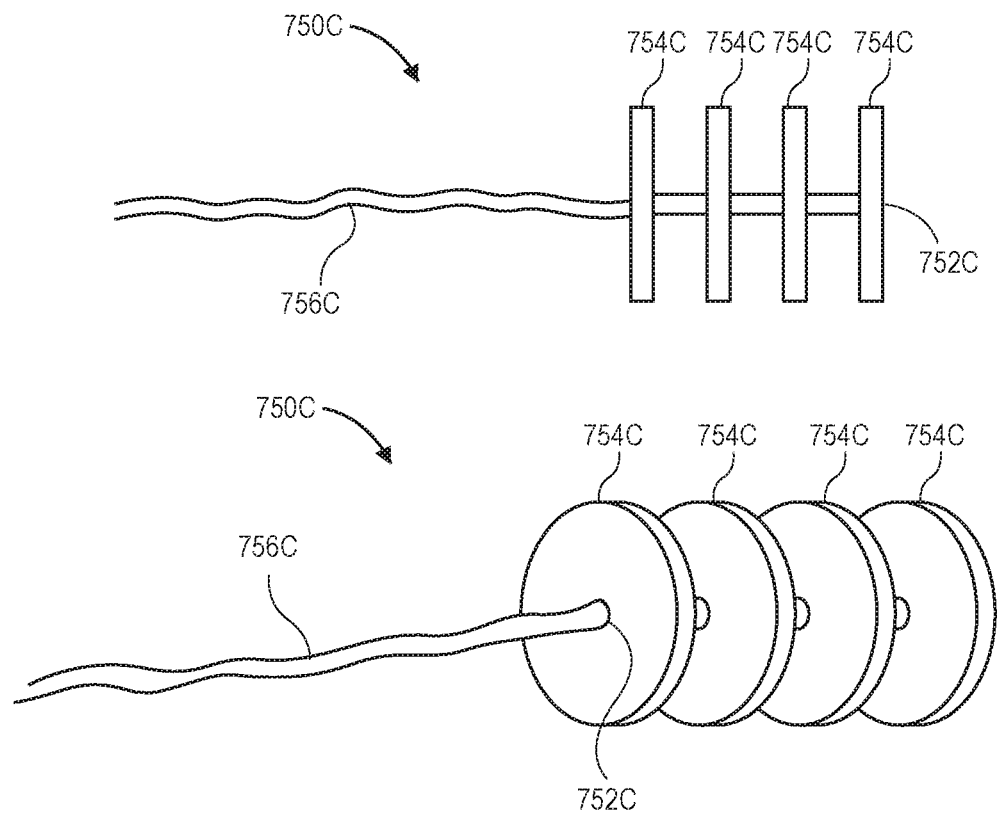

As is shown in FIG. 7C, a passive brush 750C has a substantially cylindrical shape, with a stem 752C and a plurality of substantially disc-shaped fins 754C joined to the stem 752C that extend radially outward therefrom and are concentric and substantially planar, with substantially equal diameters. Additionally, the passive brush 750C further includes a tension member 756C joined or formed integral to one end of the stem 752C. The tension member 756C may be flexible (e.g., a string or a cord) or rigid (e.g., a rod, a wire, or another member, which may be bendable or not), and may be used to insert and/or remove the tension member 756C from one or more openings or cavities, or to place and/or remove the tension member 756C from contact with one or more surfaces. Thus, the passive brush 750C may be inserted into an opening or a cavity having one or more dimensions that are substantially equal to a diameter of the fins 754C, and subjected to excitation at one or more natural frequencies to release any dirt, dust or other debris from surfaces thereof. Subsequently, the passive brush 750C may be withdrawn from the opening or the cavity by the tension member 756C.

Figure 7D:
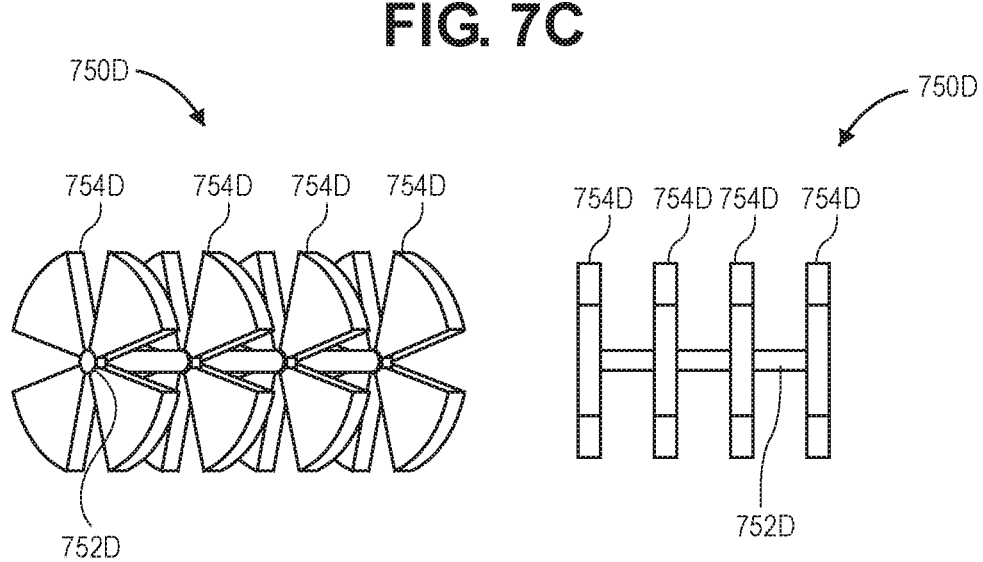

As is shown in FIG. 7D, a passive brush 750D has a substantially cylindrical shape, with a stem 752D and a plurality of fins 754D joined to the stem 752D. The fins 754D are segmented in nature, and include a plurality of extensions or appurtenances that extend radially outward from the stem 752D, similar to blades of a propeller or sails of a windmill. In some embodiments, one or more of the fins 754D, or the extensions or appurtenances thereof, may vibrate at peak powers or energies that differ from one or more of the other fins 754D, or from one or more of the other extensions or appurtenances thereof.

As is discussed above, the passive brushes of the present disclosure are not limited to use in connection with openings or cavities of vehicles, e.g., aerial vehicles. Rather, the passive brushes of the present disclosure may be placed in contact with, e.g., alongside or adjacent to, one or more surfaces of any type or form of component that may be fouled with dirt, dust or other debris, and subjected to excitation at one or more natural frequencies of the passive brushes. Referring to FIGS. 8A through 8D, views of aspects of one system in accordance with embodiments of the present disclosure are shown. Except where otherwise noted, reference numerals preceded by the number "8" shown in FIGS. 8A through 8D indicate components or features that are similar to components or features having reference numerals preceded by the number "7" shown in FIGS. 7A through 7D, by the number "6" shown in FIGS. 6A through 6F, by the number "4" shown in FIGS. 4A through 4E, by the number "2" shown in FIG. 2 or by the number "1" shown in FIGS. 1A through 1F.

Figure 8A:
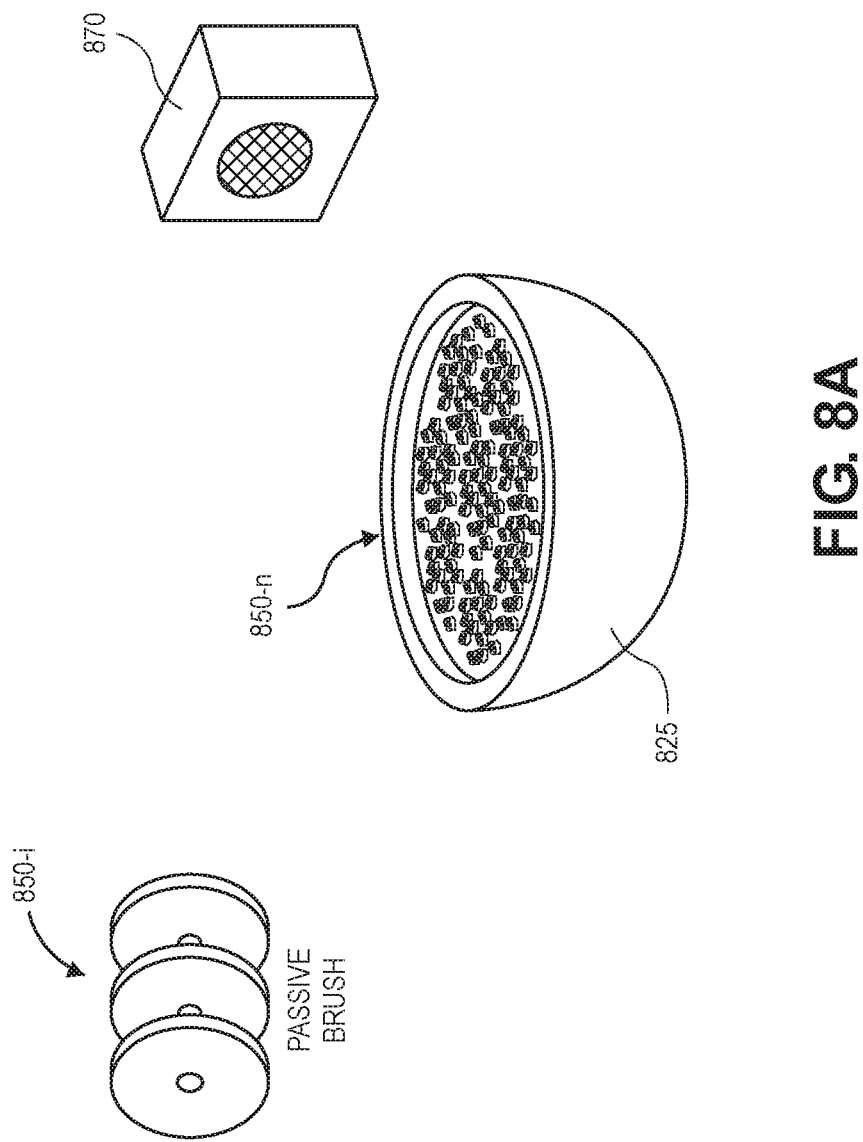
FIGS. 8A through 8D are views of aspects of one system in accordance with embodiments of the present disclosure.

As is shown in FIG. 8A, a plurality of passive brushes 850-$n$ are placed within a container 825 (e.g., a bowl or a vat) that is located within an operating range of an excitation source 870 (e.g., an acoustic speaker). Each of the passive brushes 850-$n$ may be substantially identical to one another, such that each of the passive brushes 850-$n$ may have common shapes, sizes or dimensions, and be formed from common materials. As is shown in FIG. 8A, a representative passive brush 850-$i$ of the passive brushes 850-$n$ includes a plurality of fins extending radially outward from a stem or pipe having a longitudinal axis. Alternatively, in some embodiments, the passive brushes 850-$n$ may have any other shape or size, including but not limited to one or more of the shapes of the passive brushes 750A, 750B, 750C shown in FIGS. 7A through 7D, or others.

Figure 8B:
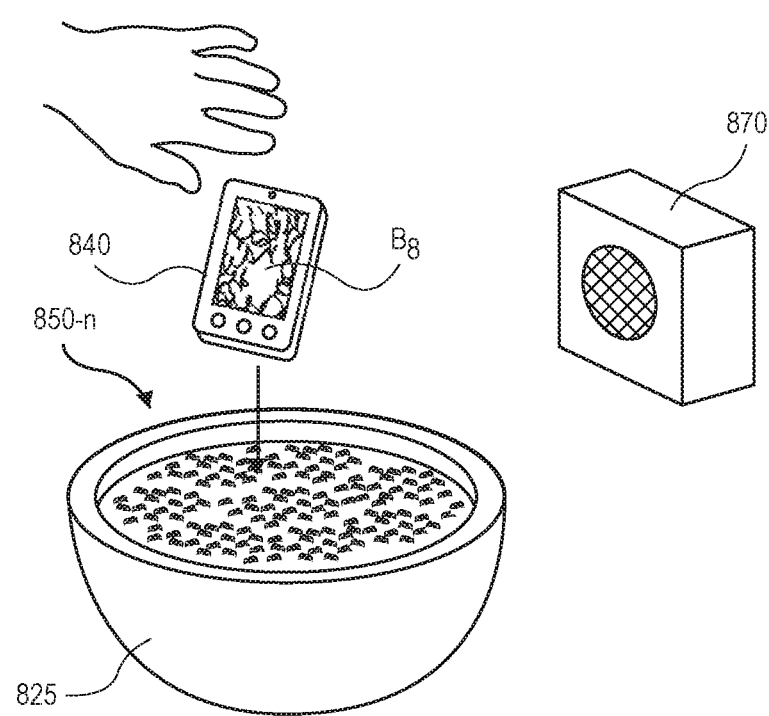

As is shown in FIG. 8B, an operator may drop or otherwise deposit a component 840 (e.g., a mobile device such as a smartphone, a tablet computer or a smart watch, or others) into the container 825. The component 840 may include debris Bs (e.g., grease, fingerprints or other materials) on one or more surfaces, and descends below an upper level of the brushes 850-$n$ within the container 825.

Figure 8C:
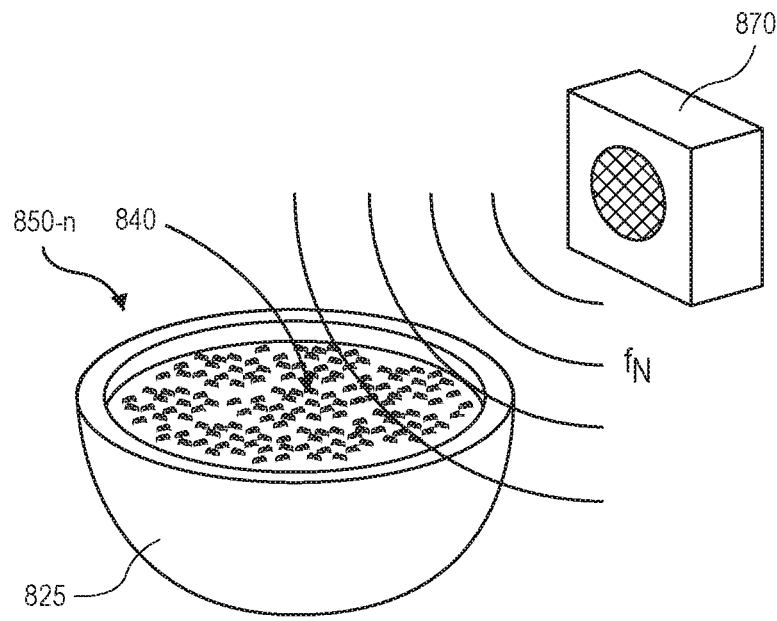

As is shown in FIG. 8C, the excitation source 870 projects acoustic energy at one or more natural frequencies $f_N$ onto the container 825 with the passive brushes 850-$n$ and the component 840 therein. The passive brushes 850-$n$ respond to the excitation by vibrating while in contact with surfaces of the component 840, including but not limited to surfaces having the debris Bs thereon.

Figure 8D:
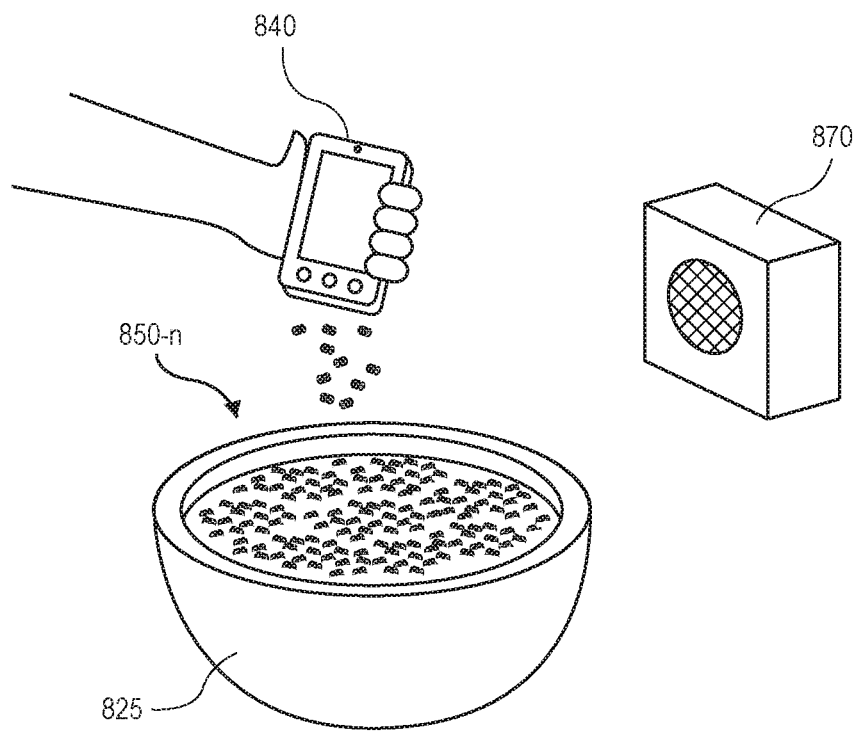

As is shown in FIG. 8D, after the excitation source 870 has stopped projecting acoustic energy at the one or more natural frequencies $f_N$ onto the container 825 with the passive brushes 850-$n$ and the component 840 therein, the component 840 is removed from the container 825. As is also shown in FIG. 8D, the component 840 is no longer plagued by the debris $B_8$ following the excitation and the physical response of the passive brushes 850-$n$ in contact with the component 840.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein may reference the use of passive brushes for cleaning internal or external components of unmanned aerial vehicles, those of ordinary skill in the pertinent arts will recognize that the systems and methods disclosed herein are not so limited. The passive brushes of the present disclosure may be provided in contact with or adjacent to surfaces of any kind, and may be utilized in connection with any type or form of vehicle (e.g., manned or unmanned) or component thereof, or any other system that is configured for any intended industrial, commercial, recreational or other use. Moreover, although some of the embodiments disclosed herein are described as being used for the release and/or removal of dirt, dust or other debris, those of ordinary skill in the pertinent arts will recognize that the passive brushes of the present disclosure may, when excited at one or more natural frequencies, be used to release any type or form of substance from any surfaces, including not only dirt, dust or debris, but also grease, grime, oils, particulates, residues, or any other substances. References to openings or surfaces that are "fouled" herein may be understood to refer to openings or surfaces that are not clean to a predetermined level or standard of quality, covered with any type of dirt, dust or debris, or otherwise not compliant with the predetermined level or standard of quality. Alternatively, "fouled" openings or surfaces may be understood to be clogged, blocked or obstructed in any manner.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIGS. 3 or 5A and 5B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
   a vehicle having at least one component;
   a first passive brush in contact with at least one surface of the at least one component, wherein the at least one surface has at least one of dirt or dust thereon, wherein the first passive brush comprises a stem defining a longitudinal axis and at least one fin mounted to the stem, and wherein the at least one fin is in contact with the at least one surface;
   an acoustic speaker configured to emit acoustic energy over at least one range of frequencies; and
   at least one computer device in communication with the acoustic speaker, wherein the at least one computer device comprises at least one memory component and at least one computer processor,
   wherein the at least one memory component has at least one set of instructions stored thereon that, when executed by the at least one computer processor, cause the system to execute a method comprising:
      subjecting, by the acoustic speaker, the at least one component to excitation at one or more natural frequencies of vibration of the first passive brush.

2. The system of claim 1, wherein the first passive brush is formed from at least one of a plastic or a rubber by one or more additive manufacturing techniques,
   wherein the first passive brush comprises a plurality of fins joined to the stem,
   wherein the plurality of fins comprises the at least one fin, and
   wherein each of the plurality of fins has a shape of a disc and extends radially outward from the stem.

3. The system of claim 1, wherein the method further comprises:
   prior to placing the first passive brush in contact with the at least one surface of the at least one component,
      subjecting, by the acoustic speaker, at least one of the first passive brush or a second passive brush to excitation over a first range of frequencies, wherein the second passive brush is substantially identical to the first passive brush; and
      identifying the one or more natural frequencies of vibration of the first passive brush based at least in part on energies of vibration of the at least one of the first passive brush or the second passive brush in response to excitation over the first range of frequencies.

4. A method comprising:
   placing at least a first passive brush in contact with at least one surface of a vehicle, wherein the first passive brush comprising a first stem defining a first longitudinal axis and at least a first fin mounted to the first stem, and wherein the first passive brush is formed from at least one of a rubber or a plastic; and
   subjecting the at least one surface of the vehicle to excitation at one or more natural frequencies of vibration of the first passive brush with the first fin in contact with the at least one surface of the vehicle.

5. The method of claim 4, wherein the first passive brush further comprises a second fin mounted to the first stem.

6. The method of claim 4, wherein each of the first fin and the second fin is a disc having a common diameter.

7. The method of claim 6, wherein the first passive brush has a substantially cylindrical shape, and
   wherein placing the first passive brush in contact with the at least one surface of the vehicle comprises:
      inserting the first passive brush into a tube,
      wherein the common diameter is less than an internal diameter of the tube.

8. The method of claim 4, wherein the at least one surface is fouled with at least one of:
debris;
dirt;
dust;
grease;
grime;
one or more liquids;
one or more oils;
one or more particulates; or
one or more residues.

9. The method of claim 4, wherein placing the first passive brush in contact with the at least one surface of the vehicle comprises:
determining a first number of passive brushes, wherein each of the first number of passive brushes comprises a stem defining a longitudinal axis and at least one fin mounted to the stem, wherein each of the first number of passive brushes is formed from the at least one of the rubber or the plastic, and wherein the first passive brush is one of the first number of passive brushes; and
placing at least some of the first number of the passive brushes in contact with the at least one surface of the vehicle.

10. The method of claim 4, further comprising:
removing at least the first passive brush from contact with the at least one surface of the vehicle,
wherein at least the first passive brush is removed from contact with the at least one surface of the vehicle by at least one of:
manual contact with the first passive brush;
manual agitation of the at least one surface of the vehicle;
suction applied to the at least one surface of the vehicle; or
electrostatic charge applied to the at least one surface of the vehicle.

11. The method of claim 4, wherein subjecting the at least one surface of the vehicle to excitation at one or more natural frequencies of vibration of the first passive brush comprises:
supplying acoustic excitation to the at least one surface of the vehicle at the one or more natural frequencies of vibration of the first passive brush.

12. The method of claim 4, further comprising:
prior to placing at least the first passive brush in contact with the at least one surface of the vehicle,
subjecting the at least one surface of the vehicle to excitation at one or more natural frequencies of vibration of the at least one surface at a first time;
determining a first energy level of vibration of the at least one surface at a first natural frequency of vibration of the at least one surface; and
determining that the first energy level of vibration is not consistent with a baseline energy level of vibration of the at least one surface at the first natural frequency,
wherein at least the first passive brush is placed in contact with the at least one surface of the vehicle in response to determining that the first energy level of vibration is not consistent with the baseline energy level of vibration of the at least one surface at the first natural frequency at a second time,
wherein the second time follows the first time, and
wherein the vehicle is engaged in at least one operation between the first time and the second time.

13. The method of claim 12, further comprising:
prior to the first time,
subjecting the at least one surface of the vehicle to excitation over a range of frequencies; and
identifying at least the first natural frequency of vibration of the at least one surface based at least in part on energies of vibration of the at least one surface of the vehicle in response to excitation over the range of frequencies.

14. The method of claim 4, further comprising:
prior to placing at least the first passive brush in contact with the at least one surface of the vehicle,
subjecting at least one of the first passive brush or a second passive brush to excitation over a range of frequencies, wherein the second passive brush is substantially identical to the first passive brush; and
identifying the one or more natural frequencies of vibration of the first passive brush based at least in part on energies of vibration of the at least one of the first passive brush or the second passive brush in response to excitation over the range of frequencies.

15. The method of claim 14, further comprising:
determining mode shapes of the first passive brush at the one or more natural frequencies of vibration; and
selecting, based at least in part on the mode shapes, at least one of:
a frequency, wherein the frequency is one of the one or more natural frequencies of vibration; or
a duration of excitation.

16. The method of claim 4, wherein at least one of the first stem or the first fin is formed from at least one of a butyl rubber, a chloroprene rubber, an ethylene propylene diene monomer rubber, an epichlorohydrin rubber, a fluoroelastomer rubber, a fluorosilicone rubber, a hydrogenated nitrile rubber, a natural rubber, a nitrile rubber, a perfluoroelastomer rubber, a polyacrylic rubber, a polyurethane rubber, a silicone rubber, a styrene butadiene rubber, a vulcanized rubber, a thermoplastic, a thermosetting plastic, a bioplastic, a polyethylene, a polypropylene, or a polyvinyl chloride, or an acrylonitrile butadiene styrene.

17. The method of claim 4, prior to placing at least the first passive brush in contact with the at least one surface of the vehicle,
forming the first passive brush by one or more additive manufacturing techniques.

18. The method of claim 4, wherein the at least one surface of the vehicle is an interior surface of a pitot tube of the vehicle.

19. A method comprising:
placing an object in contact with a plurality of passive brushes, wherein each of the passive brushes is substantially identical to one another, wherein each of the passive brushes is formed from at least one of a plastic or a rubber by one or more additive manufacturing techniques, wherein each of the passive brushes comprises a stem and a plurality of fins joined to the stem, and wherein each of the plurality of fins has a shape of a disc and extends radially outward from the stem;
determining at least one natural frequency of vibration of at least one of the plurality of passive brushes; and
subjecting the object to excitation at the at least one natural frequency of vibration with at least one fin of each of the plurality of passive brushes in contact with the object.

20. The method of claim 19, wherein the object is a component of an aerial vehicle.

* * * * *